United States Patent [19]

Lynch et al.

[11] Patent Number: 5,318,619

[45] Date of Patent: Jun. 7, 1994

[54] POLYURETHANE-BASED AQUEOUS MULTICOLOR PAINT

[75] Inventors: James F. Lynch, Schaumburg; John Predkelis, Glen Ellyn, both of Ill.

[73] Assignee: Multicolor Specialties, Inc., Cicero, Ill.

[21] Appl. No.: 43,849

[22] Filed: Apr. 6, 1993

Related U.S. Application Data

[63] Continuation-in-part of Ser. No. 851,525, Mar. 16, 1992, Pat. No. 5,199,980, which is a continuation-in-part of Ser. No. 694,311, May 1, 1991, Pat. No. 5,114,485, which is a continuation-in-part of Ser. No. 586,762, Sep. 21, 1990, Pat. No. 5,114,484.

[51] Int. Cl.$^5$ ............................................. C09D 5/29
[52] U.S. Cl. ............................... 106/311; 106/24 R; 106/26 R; 106/28 R; 106/124; 106/163.1; 106/170; 106/190; 106/191; 106/203; 106/204; 106/209; 106/253; 106/401; 106/468; 106/482; 524/43
[58] Field of Search .......... 106/24, 26, 27, 28, 106/29, 30, 32, 124, 163.1, 170, 190, 191, 203, 204, 209, 253, 311, 401, 468, 482; 428/927, 543

[56] References Cited

U.S. PATENT DOCUMENTS

| | | | |
|---|---|---|---|
| 3,370,024 | 2/1968 | Grasko et al. | 106/170 |
| 3,811,904 | 5/1974 | Zola | 106/288 |
| 3,852,076 | 12/1974 | Grasko | 106/26 R |
| 3,950,283 | 4/1976 | Sellars et al. | 106/170 |
| 3,956,206 | 5/1976 | Sellars et al. | 524/44 |
| 4,376,654 | 3/1983 | Zola | 106/170 |

FOREIGN PATENT DOCUMENTS 1298201 11/1972 United Kingdom .

*Primary Examiner*—Mark L. Bell
*Assistant Examiner*—Scott L. Hertzog
*Attorney, Agent, or Firm*—Olson & Hierl, Ltd.

[57] ABSTRACT

An improved polyurethane-based water-in-water multicolor paint composition is provided having a disperse phase and a continuous phase which is characterized by an accelerated capacity to transfer from an applicator surface to a substrate surface during paint application. The disperse phase preferably is comprised of a water dispersible, inert film-forming, crosslinkable, polyurethane polymer system; hydroxy (lower alkyl) cellulose; quaternized water soluble cellulose ether; peptized clay and water. The continuous phase preferably is comprised of such a polyurethane polymer system, a water soluble, film-forming, crosslinkable, pressure-responsive contact adhesive, a peptized clay and water. Methods for preparing the paint are also provided.

34 Claims, 1 Drawing Sheet

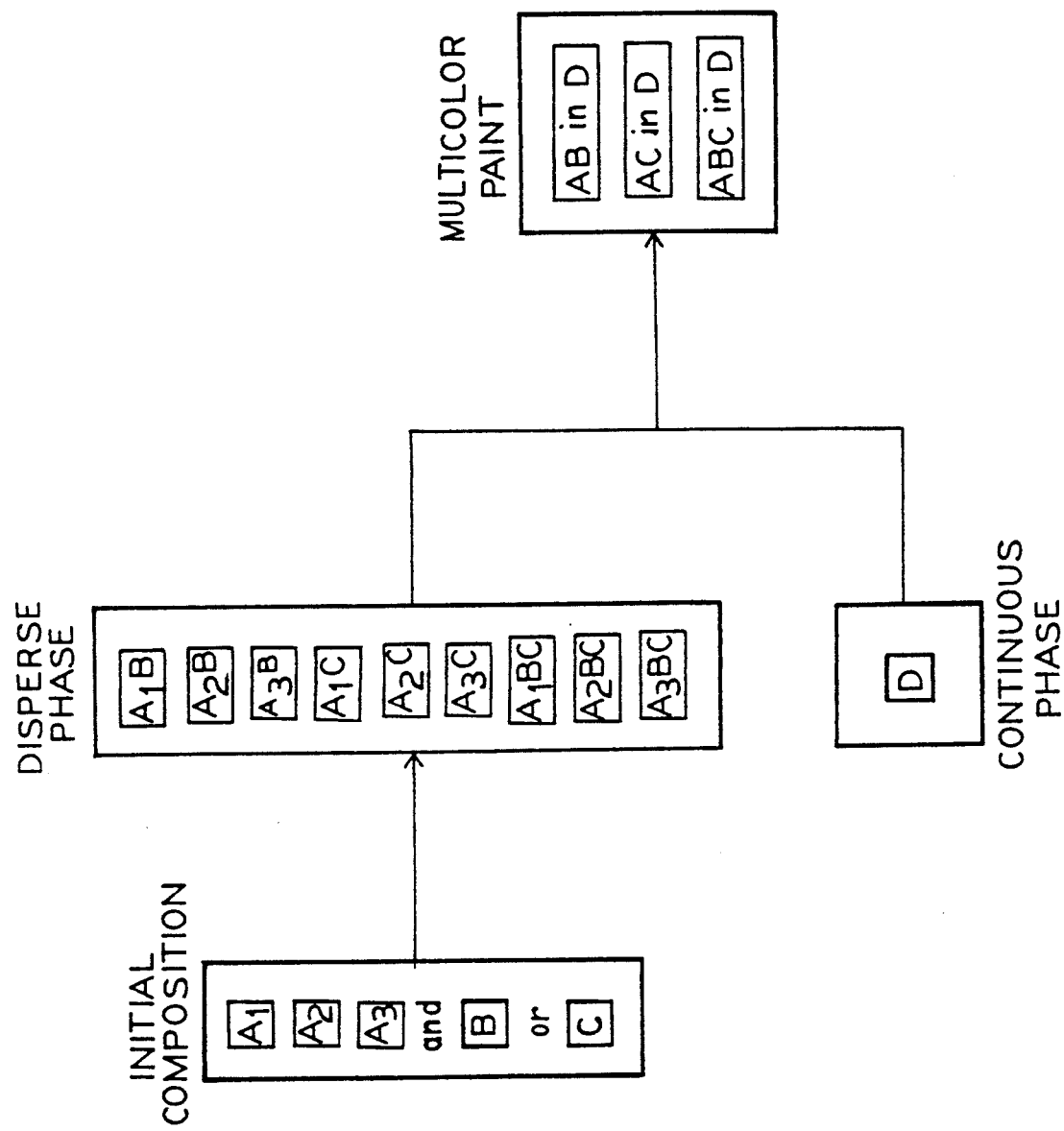

5,318,619

POLYURETHANE-BASED AQUEOUS MULTICOLOR PAINT

CROSS-REFERENCE TO RELATED APPLICATION

This application is a continuation-in-part of pending application Ser. No. 851,525 filed Mar. 16, 1992 now U.S. Pat. No. 5,199,980; which in turn is a continuation-in-part of application Ser. No. 694,311, filed May 1, 1991, now U.S. Pat. No. 5,114,485 issued May 19, 1992; which in turn is a continuation-in-part of application Ser. No. 586,762, filed Sep. 21, 1990, now U.S. Pat. No. 5,114,484 also issued May 19, 1992.

FIELD OF THE INVENTION

The present invention relates to an improved polyurethane-based water-in-water multicolor paint emulsion which can be applied rapidly as a surface coating with a paint roller, a brush or spray equipment.

BACKGROUND OF THE INVENTION

A multicolor paint is a composition which, when coated on a surface and dried, results in a coating that is characterized by dispersed discrete visibly discernible spots (or dots).

Water-in-water multicolor paints have been proposed (see, for example, Sellars et al. U.S. Pat. No. 3,950,283; Grasko U.S. Pat. No. 3,852,076 and Zola U.S. Pat. No. 4,376,654) and are of commercial interest particularly in view of the developing governmental interest in establishing regulations limiting the quantity of organic volatiles emitted into the environment by a paint during application and subsequent air drying. The states of California, New Jersey and New York, for example, have adopted regulations limiting paint emissions and many other states reportedly will be adopting similar regulations.

The above-indicated related applications and patents provide new and very useful water-in-water multicolor paints which overcome various prior art problems. In such a new multicolor paint, there are aqueous disperse phase color bodies that are characterized by having:

(a) a relatively high content of water dispersible, film-forming, crosslinkable polymer in association with a crosslinking agent, (b) a relatively high structural integrity, and (c) a capacity to form highly crosslinked, water insoluble, chemical resistant, mar resistant and thermally stable coatings with a high degree of hardness after paint application and drying.

These water-in-water multicolor paints are based upon crosslinkable carboxylated polymers and crosslinkable polyurethane polymers.

When a painter manually applies such a water-based multicolor paint emulsion by transfer from an applicator (such as a brush, roller or the like), there is a tendency for the painter to stroke the paint-carrying applicator backwards and forwards repetitively over the substrate being coated (i.e., painted) in order to achieve the desired transfer and coverage (with regard to both initial paint application and also paint coating thickness). The more the stroking, the greater the possibility of rupturing a portion of some of the disperse phase bodies that produce the multicolor effect in a dried coated paint. To minimize the possibility of such undesirable rupturing, it would be desirable to somehow effectuate a more rapid transfer of multicolor paint from an applicator to a substrate. Associated further properties of early tack, quick stick and significant green strength would also be desirable.

The present invention provides a multicolor paint emulsion which provides such an accelerated paint transfer capability.

SUMMARY OF THE INVENTION

The present invention provides an improved water-in-water multicolor paint which is characterized by a surprising accelerated capacity to transfer from an applicator surface to a substrate surface during paint application.

Surprisingly, the accelerated transfer rate of an inventive paint is achieved from an applicator, such as a brush, roller or the like, to a substrate surface without adversely affecting the desirable multicolor paint quality characteristics and especially without adversely affecting the stability characteristics of the disperse phase color bodies. These stability characteristics include liquid multicolor paint storage stability, disperse phase body stability during paint application by an applicator, and dried, coated paint stability following application. Also, the inventive paints retain the capacity for spray application, if desired.

In addition, a paint of this invention is characterized by having early tack, quick stick and excellent green strength qualities.

The present inventive multicolor paint is achieved by introducing a controlled amount of at least one member of a certain group of water-dispersible, crosslinkable, film-forming pressure-responsive contact adhesives into a water-in-water multicolor paint of the type having a continuous phase and a disperse phase and wherein the disperse phase is comprised of bodies that incorporate a mixture of polymeric materials comprised of:

(a) water dispersed, inert film-forming, crosslinkable polyurethane polymer system selected from the group consisting of a polyurethane polymer system, a carboxylated polymer system, and mixtures thereof, and (b) hydroxy (lower alkyl) cellulose and/or alkali metal carboxyl (lower alkyl) cellulose.

Also, a pigment is optionally but preferably present in the disperse phase bodies and also in the continuous phase.

In the continuous phase, the water dispersed film-forming, crosslinkable polymer system preferably comprises on a 100 weight percent total polymer solids basis about 75 to and including 100 weight percent of a polyurethane polymer system and correspondingly from and including 0 up to about 25 weight percent of a carboxylated polymer system.

In the present inventive multicolor paint, the continuous phase and the disperse phase can generally be compounded and prepared as described in the above-referenced parent patent application, U.S. Ser. No. 851,525, and also in concurrently filed U.S. Ser. No. 08/043,520 filed on even date, except that a selected pressure-responsive contact adhesive is added to and admixed with the continuous and/or the discontinuous phases, or preferably only with the continuous phase, as described herein. The disclosure of these applications are incorporated herein by reference.

The resulting multicolor paint composition of this invention surprisingly and unexpectedly displays the capacity to transfer from an applicator onto a substrate surface which is being painted usually far more quickly than can be achieved with a corresponding multicolor paint which does not contain the pressure-responsive contact adhesive. The substantially higher transfer rate not only results in relatively rapid transfer of paint from applicator to substrate, but also results in producing thicker paint substrate coatings in a shorter time frame than is achievable with a corresponding multicolor paint which does not contain the pressure-responsive contact adhesive. Better early tack, better quick stick and better green strengths are also observed.

A coating comprised of a multicolor paint composition of this invention characteristically and surprisingly dries to a smooth, durable, non-tacky, highly water resistant layer.

The inventive multicolor paints have excellent stability characteristics as indicated above. The dried coatings resulting from brush and roller application display excellent surface and wear characteristics. The desirable qualities of the polyurethane-based, water-in-water multicolor paint emulsions produced by the methods of U.S. Ser. No. 851,525 and Ser. No. 08/043,520 are believed to be retained.

Other and further objects, aims, purposes, features, advantages, embodiments, and the like will be apparent to those skilled in the art from the present specification taken with the appended claims.

BRIEF DESCRIPTION OF THE DRAWING

In the drawing, a flow sheet is shown illustrating blending sequences suitable for use in practicing the present invention.

DETAILED DESCRIPTION (a) Definitions

The term "water dispersed" or "water dispersible" as used herein with reference, for example, to a polyurethane polymer, a carboxylated polymer, a reactive curative, a crosslinking agent or like material means that the material can form a water solution or a colloidal suspension in water. However, to enhance the water dispersability of such a material, and to increase the amount of the material which is present per unit of liquid volume in a water dispersed form, particularly in the disperse phase of a multicolor paint of this invention, the water is preferably admixed with a limited amount of water miscible organic liquid or cosolvent, such as hereinafter characterized and illustrated, wherein, for example, the polymer or other material, is at least as dispersible as in water.

The term "dispersed" (and its equivalent word forms such as "dispersible", "dispersability" and the like) is intended to include both colloidal and macrocolloidal suspensions, solutions, mixtures thereof, and the like. Preferably, such a polymer or other material is characterized by a capacity to disperse in the water-miscible organic solvent (i.e., cosolvent) to an extent which is similar to that of the material dispersability in water alone. When a cosolvent is present, the quantity thereof is preferably less than about 8 weight percent based on the total weight of the aqueous carrier liquid (or solvent or dispersing liquid) that is present in a given starting polymer dispersion or solution particularly in order to comply with the foregoing regulations regarding permissible volatiles.

The term "crosslinkable" as used herein with reference to a water dispersed polyurethane system, a water dispersed carboxylated polymer, or the like, means that the polymer, after being applied to a surface from an aqueous coating composition (particularly a multicolor paint composition of this invention) and allowed to form a film or coating, crosslinks (that is, thermosets or cures) and becomes water insoluble through reaction. The crosslinking occurs preferably during the drying which takes place after an aqueous coating composition of the polymer is applied as a coating to a substrate surface and the aqueous carrier of the coating composition is evaporated. Also, the crosslinking preferably occurs at ambient temperatures and pressures, although heat may sometimes be used to accelerate the drying and the crosslinking reaction.

The term "reactive curative" as used herein refers to any reagent or combination of reagents which will react with a crosslinkable polyurethane polymer (including a mixture of crosslinkable polyurethane polymers) to produce a crosslinked polyurethane product when both reagent(s) and the polyurethane polymer are first dispersed together in an aqueous starting dispersion and then are incorporated into a paint composition of this invention which is then coated upon a solid substrate and dried. As indicated herein, a reactive curative can sometimes be (that is, function as) a crosslinking agent for a crosslinkable carboxylated polymer.

The term "crosslinking agent" as used herein refers to an agent which, in dispersed combination with a crosslinkable carboxylated polymer in an aqueous paint composition of this invention, reacts with the polymer to produce a crosslinked carboxylated polymeric product after the paint composition has been coated upon a solid substrate and dried.

The term "storage stability" as used herein with reference to a multicolor paint of this invention means that the paint passes the test procedure of ASTM D-1849-80 which relates to the package stability of paint stored in a 1 quart or 1 liter container at $125° \pm 2°$ F. ($52° \pm 1°$ C.) for 1 month or 2 months, respectively, with regard to consistency and settling.

The term "structural integrity" as used herein in relation to a multicolor paint and the disperse phase bodies therein refers to the ability of the disperse phase bodies therein to remain stable and substantially unchanged when subjected at ambient temperature and pressure to a shear mixing force exerted by a Cowles mixing blade operating at about 450 to about 500 rpm.

As used herein, the term "water resistance" as used herein with reference to a coated and dried film or coating produced from a multicolor paint of this invention refers to the test procedure of ASTM D-1308-79 with regard to both covered and open spot tests.

The term "paint" is used herein in the broad sense of a coloring and coatable substance for spreading as a coating on a surface.

The term "inert film-forming" as used herein in reference to a given polymer or polymer system, particularly a polyurethane polymer system which is employed in a multicolor paint of this invention, indicates that, when the given polymer or polymer system is deposited on a substrate surface as a dried and substantially solvent-free coating, which may or may not be crosslinked, and which is comprised substantially only of the given polymer or polymer system, that coating is substantially inert. The term "inert" as used herein in this context has reference to the fact that such coating is a solid, has a substantially non-tacky surface, and is substantially insoluble and resistant when transitionally contacted with water and common organic solvents such as may be used generally in the paint art.

In contrast, the term "film-forming" as used herein in reference to a given polymer or polymer system, particularly a pressure-responsive (or pressure-sensitive) contact adhesive which is employed in a multicolor paint of this invention indicates that, when the given polymer or polymer system is deposited on a substrate surface as a dried and substantially solvent-free coating which may or may not be crosslinked and which is comprised substantially only of the given polymer or polymer system, that coating is substantially tacky. The term "tacky" as used herein in this context has reference to the fact that such coating has a sticky surface to which solid objects contacted thereto adher.

(b) Starting Materials

The term "polyurethane" as used herein refers to a thermoplastic polymer which can be made crosslinkable (or thermosettable) and which is produced by the reaction of a polyisocyanate (that is, an organic compound containing at least two isocyanate (—N=C=O) groups per molecule) and a polyol (that is, a glycol compound containing at least two hydroxyl (—OH) groups per molecule). The polymeric reaction product contains repeating carbamate ester linkages (or urethane linkages) of the structure:

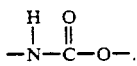

When such linkages are present in a polymer, it is classified as a polyurethane herein.

Polyisocyanates also react with amines (that is, compounds which contain at least one primary or secondary amino

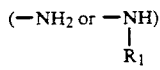

group per molecule (where $R_1$ is typically an alkyl, aryl, or like hydrocarbonaceous radical) in a similar fashion to produce a polymeric reaction product that contains urea linkages:

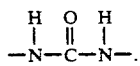

Polymers containing both urethane and urea linkages are known as polyurethane ureas and such polyurethane polymers can be used as starting polymers in the practice of this invention.

Either the starting polyisocyanate or the starting polyol can itself have an internal polymeric structure. Examples of suitable structures include polyethers, polyesters, polyalkyls, polydimethylsiloxanes, and the like. Commonly used isocyanates in polyurethane synthesis include toluene dissocyanate (TDI) and methylene bis (p-phenyl isocyanate) or 4,4'-dimethylmethane diisocyanate (MDI) although many other isocyanates are available. Commonly used polyols include polyester and polyethers.

A polyurethane polymer can contain various functional (i.e., reactive) groups, such as one or more groups selected from the class consisting of isocyanato, hydroxyl and amino (particularly primary or secondary amino). Such functional groups are characteristically associated with polyurethane polymers. However, in addition to, or apart from, such functional groups, a polyurethane polymer can also contain other functional groups such as carboxyl groups, sulfonic acid groups, and the like, as those skilled in the art will appreciate.

Since the reaction of equimolar quantities of a macroglycol (or a polymeric polyol) and a diisocyanate typically results in a polymer with poor physical properties, it is common to react the diisocyanate with a low molecular weight chain extender to produce a high molecular weight hard sequent which, when then reacted with a macroglycol, results in a two-phase polyurethane microstructure with desirable physical properties. Diols and diamines are used for such chain extension. However, particularly because of dissolution and dispersion forming capacity, diols are presently preferred for use as chain extenders in making such polyurethanes for use as starting materials in the practice of this invention.

The water dispersed, inert film-forming, crosslinkable polyurethane polymers and the aqueous polyurethane dispersions which are employed as starting materials in the practice of this invention are generally known to the prior art and do not as such constitute a part of the present invention. Aqueous crosslinkable polyurethane dispersions are commercially available from a plurality of sources and are generally suitable for use in the practice of this invention.

Although both aromatic and aliphatic aqueous crosslinkable polyurethane dispersions can be used, the aliphatic type is presently most preferred for use in this invention because this type typically has better color stability and more ultraviolet light (UV) resistance. Aromatic types apparently have a tendency to yellow with age.

Various polymeric backbone types or classes can be used in a given starting polyurethane dispersion that is employed in this invention. Examples include:

A. Polyester type: Exhibits strong adhesion to difficult substrates.

B. Polyether type: Imparts softness, flexibility, hydrolysis resistance and UV resistance to dried coatings.

C. Polycarbonate: Dried coatings display improved resistance to blocking, heat, ambient weather conditions, and resistance to chemicals.

D. Mixtures of different polymeric types which display combinations of properties can be prepared, for example, by using very high molecular weight polymer chains, or by introducing branching or crosslinking into a polymer network.

Typically, though not necessarily, a starting aqueous polyurethane dispersion is formulated with an internal stabilization system. Polyurethane dispersions, as those skilled in the art will appreciate, may be classified according to the conventional internal stabilization system used, such as: 1) anionic; 2) cationic or 3) nonionic. Of these three main systems, anionic polyurethane dispersions are presently most preferred. Nonionic types tend to be susceptible to water because of the inherent hydrophilic nature of the associated polymer and therefore are believed to be least desirable for use in the practice of this invention. Dispersion stabilization systems are known to the polyurethane art and are not as such a part of the present invention.

Since the internal stabilization systems used in starting polyurethane dispersions particularly of the types that are commercially available do not adversely affect the method of preparation, the storage stability, the crosslinkability or the usability of product water-in-water multicolor paints or this invention, so far as is now known, it is convenient and now preferred to consider the internal stabilization system as part of the starting water dispersed, film-forming, crosslinkable, polyurethane composition for purposes of weight percent calculations and the like in preparing (and using) a product multicolor paint of this invention.

Typical properties associated with starting crosslinkable polyurethane dispersions are illustrated in Table I below:

Type 3. One-component-blocked: These polyurethane dispersions contain blocked isocyanate groups which are chemically bound into the polyurethane polymer chains and which are regenerated (or unblocked) at elevated temperatures such as at a predetermined temperature that can be utilized in a drying operation for a particular coating. The liberated isocyanate groups then undergo the normal crosslinking reactions with urethane or urea groups on the originating or adjacent polymer chains. Such latent or blocked crosslinking sites are formed by reaction of pendant or terminal isocyanate groups with blocking agents, which pref-

TABLE I

TYPICAL PROPERTIES ASSOCIATED WITH POLYURETHANE DISPERSIONS

| | ALIPHATIC POLYCARBONATE | AROMATIC POLYETHER | ALIPHATIC POLYETHER | ALIPHATIC POLYESTER (SOFT) | ALIPHATIC POLYESTER (HARD) |
|---|---|---|---|---|---|
| I. Dispersions | | | | | |
| Viscosity cps @ 25° C. | 100 GPS | 50 GPS | 20440 GPS | 100 GPS | 100 GPS |
| pH | 7.5 | 7.5 | 8.0 | 8.0 | 8.0 |
| II. Dried Coatings from Dispersions | | | | | |
| Tensile strength (MPa) | 40 | 10 | 40 | 40 | 45 |
| 100% modulus (MPa) | 20 | 2 | 9 | 2 | 35 |
| Extension at break (%) | 290 | 1,000 | 700 | 1,000 | 250 |
| Konig hardness (secs) | 75 | 15 | 78 | 13 | 90 |
| Est. N-methyl-2-pyrrolidone content (weight %) | 9.5 | 0 | 1 | 2 | 12.5 |
| Solids % | 30 | 35 | 40 | 40 | 30 |

Starting aqueous crosslinkable polyurethane dispersions can be crosslinked in the various ways known to the prior art. The moisture cure mechanism, however, is precluded for use in the aqueous polymer system employed in the present invention. Suitable and presently preferred crosslinking polyurethane systems that are suitable for use in the practice of the present invention can be cataloged as follows:

Type 1. One-component-precrosslinked: These polyurethane dispersions are formed by introducing tri- or higher poly-functionality into the component polymeric molecular chains using suitable monomers, such as multifunctional isocyanates, alcohols and/or amines. The resulting polyurethane dispersions tend to require the presence in the liquid carrier of a considerable proportion of an organic cosolvent, such as, for example, N-methyl-2-pyrrolidone, or the like. Crosslinking occurs during drying after coating without other additives being present.

Type 2. Two-component: These polyurethane dispersions are crosslinked by a multifunctional reactive curative which is preferably admixed with a polyurethane dispersion before it is incorporated into a composition of the invention and then is coated on a substrate. Crosslinking then occurs during coating and drying. Thus, crosslinking can be effected with reactive curatives which are water dispersible polyisocyanates. A presently preferred class of such two-component polyurethane dispersions comprises dispersed, anionically stabilized crosslinkable polyurethanes containing incorporated functional carboxyl groups in combination with a reactive curative. The carboxyl groups enhance formation of aqueous dispersions of the polyurethane polymer, and the dispersed carboxylated polyurethane polymer can be crosslinked with a wide range of acidic reactive curatives, including water dispersible polyisocyanates, multifunctional epoxy resins, multifunctional carbodiimides, polyfunctional aziridines, mixtures thereof, and the like.

erably are relatively low molecular weight compounds capable of forming thermally reversible bonds with isocyanate groups. When a coating containing such a polymer is heated to a certain temperature, the unblocking occurs preferably almost quantitatively, yielding both free isocyanate groups capable of crosslinking the polyurethane. The free blocking agent either remains, or preferably, migrates and evaporates. Heating is thus usually associated with the application and/or drying of polyurethane dispersions of this type. For present purposes, heating temperatures that are effective for initiating crosslinking below about 100° C. are preferred.

Crosslinking systems for aqueous crosslinkable polyurethanes are known to the polyurethane prior art and are not as such part of the present invention. Since the polyurethane crosslinking systems used in starting polyurethane dispersions particularly of the types that are commercially available do not adversely affect the method of preparation, the storage stability or the usability of product water-in-water multicolor paints of this invention, so far as is now known, it is convenient and now preferred to consider the crosslinking system as part of the starting water dispersed, inert film-forming, crosslinkable polyurethane composition for purposes of weight percent calculations and the like in preparing (and using) a product multicolor paint of this invention.

For example, and preferably, a starting water disperse, film-forming, crosslinkable polyurethane polymer system composition used in the practice of this invention can comprise on an estimated 100 weight percent total solids basis about 75 to and including 100 weight percent of starting polyurethane polymer, from and including 0 up to about 25 weight percent of starting reactive curative. Additionally, such system may optionally contain from and including up to about 15 weight percent of starting internal stabilization system. For convenience in practicing this invention, such a polymer composition can be considered to be a starting water dispersed, inert film-forming, crosslinkable polyurethane polymer system.

Also, the amount of water that is present in a given starting aqueous crosslinkable polyurethane polymer system dispersion (including solution) is typically in the Mixtures of different inert film-forming polyurethane polymers can be employed, if desired.

Some examples of suitable commercially available starting aqueous crosslinkable polyurethane dispersions and their properties are shown in Table II below.

TABLE II

EXEMPLARY STARTING AQUEOUS CROSSLINKABLE COMMERCIALLY AVAILABLE POLYURETHANE DISPERSIONS

| | | | Dispersion Composition | | |
|---|---|---|---|---|---|
| I.D. | Manufacturer | Polymer Type (Aliphatic or Aromatic) | % Polyurethane Solids in Dispersion | % water | organic solvent % |
| | K. J. QUINN & CO., INC. SEABROOK, NH Products: | | | | |
| 1. | QW10 | Aliphatic[1] | 32 | | |
| 2. | QW12 | Aliphatic[1] | 35 | | |
| 3. | QW14 | Aliphatic[1] | 30 | 58.5 | 11.5 |
| 4. | QW16 | Aliphatic[1] | 40 | | |
| 5. | QW18-1[3] | Aliphatic[1] | 35 | 52 | 13.0 |
| | POLYVINYL CHEMICAL INDUS WILMINGTON, MA Products: | | | | |
| 6. | R-960 | Aliphatic | 33 | 48.5 | 18.5 |
| 7. | R-962 | Aliphatic | 34 | | |
| 8. | R-966 | Aliphatic | 34 | | |
| 9. | R-966 | Aliphatic | 33 | | |
| 10. | R-967 | Aliphatic | 40 | 60 | 0 |
| | WITCO HOUSTON, TX Products: | | | | |
| 11. | W-232 | Aliphatic | 30[2] | 56.6 | 13.4 |
| 12. | W-234 | Aliphatic | 30[2] | 57.7 | 12.3 |
| 13. | W-240 | Aliphatic | 30[2] | 56.6 | 13.4 |
| 14. | W-280 | Aliphatic | 62[2] | 38 | |
| 15. | W-290-H | Aliphatic | 62[2] | 38 | 0 |
| 16. | W-293 | Aliphatic | 67[2] | 33 | 0 |
| 17. | W-3291 | Aliphatic | 60[2] | | |
| 18. | W-3294 | Aliphatic | 65[2] | | |
| | SANCOR INDUST. LEOMINSTER, MA Products: | | | | |
| 19. | Sancure 815 | Aliphatic | 35 | 56.5 | 8.5 |
| 20. | 822A | Aliphatic | 30 | 55.6 | 13.4 |
| 21. | 847 | Aliphatic | 30 | 62.8 | 7.2 |
| 22. | 849 | Aliphatic | 35 | | |
| 23. | 862 | Aliphatic | 35 | | |
| 24. | 865 | Aliphatic | 35 | | |
| 25. | 867 | Aliphatic | 40 | 60 | 0 |
| 26. | 878 | Aliphatic | 38 | 62 | 0 |
| 27. | 895 | Aliphatic | 35 | | |
| 28. | 898 | Aliphatic | 32 | 60.2 | 7.8 |
| 29. | 899 | Aliphatic | 35 | 57.0 | 8.0 |
| 30. | 1818 | Aliphatic | 35 | | |
| 31. | 9500 | Aliphatic | 40 | | |

Table II footnotes:
[1]Based upon information supplied by the indicated manufacturer, the polyurethane contained in this dispersion is believed to be a polyester.
[2]Based upon information supplied by the indicated manufacturer, this dispersion is believed to contain an anionic internal stabilization system.
[3]Based upon information supplied by the indicated manufacturer, this dispersion is believed to contain a polyurethane polymer which has a molecular weight in the range of about 5700 to about 7000.

range of about 30 to about 65 weight percent and is preferably in the range of about 50 to about 58 weight percent (on a 100 weight percent total starting polyurethane dispersion basis) with the amount of cosolvent when present ranging from and including 0 up to about 8 weight percent as indicated above, on the same basis. Starting polyurethane dispersions containing other respective weight percentages of such components can also be employed, if desired. Also, as is typical of commercially available polyurethane dispersions, minor amounts of other components can sometimes be present.

While it is presently preferred to make a multicolor paint of this invention using only one or more starting aqueous polyurethane polymer system dispersions as the crosslinking polymer, useful multicolor paints of this invention can also be prepared by using a polyurethane polymer system dispersion in combination with a water dispersed, film-forming, crosslinkable, carboxylated polymer system as described herein.

Optionally but typically an organic crosslinking agent is used with a carboxylated polymer system. Also optionally but typically, a carboxylated polymer system comprises on a 100 weight percent total solids basis about 75 to and including 100 weight percent of carboxylated polymer and correspondingly from and including 0 to up to about 25 weight percent of organic crosslinking agent. Also, the amount of water that is present in a given starting aqueous crosslinkable carboxylated polymer system dispersion (including solution) is typically in the range of about 30 to about 65 weight percent and preferably is in the range of about 50 to about 58 weight percent (on a 100 weight percent total starting carboxylated polymer basis) with the amount of cosolvent when present ranging from and including 0 up to about 8 weight percent on the same basis. Other starting carboxylated polymer dispersions containing different respective weight percentages of such components can also be employed, if desired. Minor amounts of other components may also be present.

The water dispersible, film-forming, crosslinkable, carboxylated polymer systems which are employed as polymeric starting materials in the practice of this invention are not polyurethanes. Thus, such a crosslinkable carboxylated polymer system is preferably substantially free from urethane linkages and urea linkages and also is preferably substantially free from functional groups selected from the class consisting of hydroxyl, amino and isocyanato. Such carboxylated polymers are generally known in the prior art and do not as such constitute part of the present invention. Some examples of such polymers are shown in Table III below. Typically and preferably, a crosslinkable carboxylated polymer contains at least about 2 weight percent of carboxyl groups on a 100 weight percent total carboxylated polymer weight basis, and more preferably at least about 3 weight percent. Preferably, such a polymer does not contain more than about 7 weight percent of carboxyl groups (same basis).

TABLE III
CROSSLINKABLE, WATER SOLUBLE, FILM FORMING CARBOXYLATED POLYMERS

| ID No. | Chemical Name | Trade Name/ Trade Mark | Manufacturer/ Source |
|---|---|---|---|
| 1. | Carboxylated Styrene Acrylate Copolymer | "Pliolite" 7103 & 7104 | Goodyear |
| 2. | Carboxy-Modified Acrylic | "Hycar" 26171 | B. F. Goodrich |
| 3. | Carboxy-Modified Acrylic | "Hycar" 26137 | B. F. Goodrich |
| 4. | Carboxy-Modified Acrylic | "Hycar" 26322 | B. F. Goodrich |
| 5. | Carboxy-Modified Acrylic | "Hycar" 26083 | B. F. Goodrich |
| 6. | Carboxy-Modified Acrylic | "Hycar" 26092 | B. F. Goodrich |
| 7. | Carboxy-Modified Acrylic | "Hycar" 2671 | B. F. Goodrich |
| 8. | Carboxy-Modified Acrylic | "Hycar" 26796 | B. F. Goodrich |
| 9. | Carboxy-Modified Acrylic | "Hycar" 26084 | B. F. Goodrich |
| 10. | Carboxy-Modified Acrylic | "Hycar" 26091 | B. F. Goodrich |
| 11. | Carboxy-Modified Acrylic | "Hycar" 26288 | B. F. Goodrich |
| 12. | Carboxy-Modified Acrylic | "Hycar" 26106 | B. F. Goodrich |
| 13. | Carboxy-Modified Acrylic | "Hycar" 26172 | B. F. Goodrich |
| 14. | Carboxy-Modified Vinyl Chloride | "Geon" 460x6 | B. F. Goodrich |
| 15. | Carboxy-Modified Vinyl Chloride | "Geon" 460x45 | B. F. Goodrich |
| 16. | Carboxy-Modified Vinyl Chloride | "Geon" 460x46 | B. F. Goodrich |
| 17. | Carboxy-Modified Vinylidene Copolymer | "Geon" 450x61 | B. F. Goodrich |
| 18. | Carboxy-Modified High Acrylonitrile | "Hycar" 1571 | B. F. Goodrich |
| 19. | Carboxy-Modified Special Acrylonitrile | "Hycar" 1570x55 | B. F. Goodrich |
| 20. | Carboxy-Modified Special Acrylonitrile | "Hycar" 1572 | B. F. Goodrich |
| 21. | Carboxy-Modified Special Acrylonitrile | "Hycar" 1578 | B. F. Goodrich |
| 22. | Carboxy-Modified Styrene Butadiene | "Goodrite" 257ox59 | B. F. Goodrich |
| 23. | Carboxy-Modified Vinyl Acetate | "Polyco" 2149c | Borden |
| 24. | Carboxy-Modified Vinyl Acetate | "Polyco" 2142 | Borden |
| 25. | Carboxy-Modified Styrene Butadiene | "Darex" 5101 | W. R. Grace |
| 26. | Carboxy-Modified Styrene Butadiene | "Darex" 5261 | W. R. Grace |
| 27. | Waterborne Aliphatic Urethane | "Sancure" 898 | Sanncor Ind. |
| 28. | Waterborne Aliphatic Urethane | "Q-Thane" QW-18 | K. J. Quinn & Co. |

As indicated above, a carboxylated styrene acrylate copolymer is the most preferred carboxylated polymer type for use in the practice of the present invention. For example, this product is available from Goodyear under the trademark "Pliolite" with the associated product designation numbers 7103 and 7104, and apparently contains about 65 percent by weight styrene and about 35 percent by weight of butyl acrylate and is carboxylated to an extent sufficient to contain about 3 to 4 weight percent carboxyl groups on a 100 weight percent total polymer weight basis.

Such a carboxylated copolymer, for example, can be comprised of about 50 to about 75 weight percent styrene and correspondingly about 25 to about 50 weight percent of at least one (lower alkyl) acrylate monomer on a total polymer weight basis. The acrylate monomer is preferably n-butyl acrylate. Such a polymer is characterized by the feature that, after its formation, it contains pendant carboxylic functional groups which are reactive with a crosslinking agent, such as a multifunctional carbodiimide or a polyfunctional aziridine, to produce a crosslinked, water insoluble product. The molecular weight of such a starting polymer is low enough to permit the polymer to be water dispersible.

In accordance with this invention, a starting aqueous or water dispersable, inert film-forming crosslinkable polyurethane or polyurethane polymer system is admixed with a starting aqueous or water dispersable, film-forming, crosslinkable pressure-responsive (or pressure sensitive) contact adhesive. Such adhesives are known to the prior art and do not as such constitute a part of the present invention.

Such a pressure-responsive contact adhesive can be a polymer which has a relatively low glass transition temperature ($T_g$). Below the $T_g$, the polymer has glasslike properties and above the $T_g$ the polymer has elastomeric properties. Presently preferred such adhesives include polyurethane polymers and acrylic polymers. Other usable such adhesives include isoprene rubber block copolymers, and vinyl acetate polymers, such as vinyl acetate polymers which are modified with an olefin such as ethylene, or aqueous vinyl acetate polymer emulsions, or the like. However, such other adhesives may tend to suffer from certain disadvantages, such as relatively poor color in a dried coating or relatively poor ultraviolet light resistance. Aliphatic urethane polymers, for example, such as those having a polyether backbone, appear to provide excellent green strength and long term durability and are presently preferred.

Examples of preferred other (non-polyurethane) suitable water dispersible, pressure-responsive, film-forming, crosslinkable contact adhesives include acrylic polymers, particularly acrylic polymers containing incorporated butyl acrylate, or acrylic polymers containing methacrylates. Preferred such acrylic polymers are selfcrosslinking.

In general, these preferred adhesives adhere to a great variety of substrates, provide clear film formation with high optical clarity, display great compatibility with multicolor paint compositions of the type involved in this invention, are non-yellowing with age, and are ultraviolet light resistant. These preferred adhesives can also be crosslinked which is presently preferred for adhesives used in the practice of this invention. Crosslinking can be variously accomplished. For example, crosslinking of the adhesives used can be accomplished through reaction with other polymeric materials present in a multicolor paint formulation, such as with an inert film-forming polyurethane polymer system, through reaction with a polyfunctional aziridine or multifunctional carbodiimide, or the like.

Preferably, as in the case of a starting water dispersed, inert film-forming, crosslinkable polymer system, a starting water dispersible, film-forming, crosslinkable pressure-responsive contact adhesive is preliminarily water dispersed or dissolved. Typically, such a polymer dispersion contains from about 30 to about 65 weight percent of the adhesive polymer and preferably this amount is in the range of about 50 to about 60 weight percent. Such a dispersion can also contain from and including 0 up to about 8 weight percent of cosolvent. Mixtures of different contact adhesives can be employed, if desired. Minor amounts of other components may sometimes be present.

Examples of suitable water dispersible, pressure-responsive, film-forming, crosslinkable contact adhesives are shown in Table III below.

TABLE III

| Water Dispersable, Pressure-Responsive Adhesives | | |
|---|---|---|
| Product | Company | Type |
| Elvare 1872 | DuPont | Vinyl acetate co-modified with Ethylene |
| Elvare 1874 | DuPont | Vinyl acetate co-modified with Ethylene |
| Elvare 1875 | DuPont | Vinyl acetate co-modified with Ethylene |
| Elvare 1875HV | DuPont | Vinyl acetate co-modified with Ethylene |
| Elvare 1877 | DuPont | Vinyl acetate co-modified with Ethylene |
| Gelva TS30 | Monsanto | Vinyl acetate polymer emulsion |
| Gelva TS65 | Monsanto | Vinyl acetate polymer emulsion |
| Gelva TS85 | Monsanto | Vinyl acetate polymer emulsion |
| Gelva S-51 | Monsanto | Vinyl acetate polymer emulsion |
| Gelva S-52 | Monsanto | Vinyl acetate polymer emulsion |
| Gelva S-55 | Monsanto | Vinyl acetate polymer emulsion |
| Gelva S-77 | Monsanto | Vinyl acetate polymer emulsion |
| Gelva S-98 | Monsanto | Vinyl acetate polymer emulsion |
| Gelva TS-70 | Monsanto | Vinyl acetate polymer emulsion |
| UCARLATEX 173 | Union Carbide | Acrylic polymer emulsion |
| UCARLATEX 174 | Union Carbide | Acrylic polymer emulsion |
| UCARLATEX 175 | Union Carbide | Acrylic polymer emulsion |
| Hycar 26171 | B. F. Goodrich | Acrylic polymer emulsion |
| Hycar 26146 | B. F. Goodrich | Acrylic polymer emulsion |
| Hycar 2600 x 207 | B. F. Goodrich | Acrylic polymer emulsion |
| Hycar 2600 x 222 | B. F. Goodrich | Acrylic polymer emulsion |
| Robond P520 | Rotim & Haas | Acrylic emulsion (butyl acrylate) |
| Robond P583D | Rotim & Haas | Acrylic emulsion (butyl acrylate) |
| Luhydran A-848-S | BASF | Methacrylate dispersion (modifies the ($T_g$) increases the glass transition temperature at room temperature) |
| LQW10-207 | K. J. Quinn | Aliphatic urethane (backbone polyether) |

While a multicolor paint of this invention as described herein can incorporate into each of the dispersed phase and the continuous phase, a mixture of both (a) one or more starting aqueous dispersions of one or both of the inert film-forming crosslinking polymer systems, and (b) one or more aqueous dispersions of film-forming pressure-responsive contact adhesives, one type of useful and presently multicolor paint of this invention can be prepared by compounding into the continuous phase a mixture of a polyurethane polymer system with such an adhesive, and by compounding into the disperse or discontinuous phase only an inert film-forming carboxylated polymer system. The advantage of such a paint type is that the disperse phase then incorporates polymers which are of relatively lower cost than the polymers incorporated into the continuous phase, yet the product multicolor paint retains the indicated desirable characteristics.

Various other materials are also employed in formulating paint compositions of this invention.

Hydroxy (lower alkyl) cellulose materials are employed in the practice of this invention as starting materials and are generally known in the prior art. As used herein, the term "lower alkyl" generally refers to an alkyl moiety containing from (and including) one through four carbon atoms. Presently most preferred for use in this invention is a cellulose type additive material such as hydroxyethyl cellulose. A suitable form of such material is available commercially under the trademark "Cellosize" from the Union Carbide Chemicals Company. Such a material is a water-soluble cellulose ether which is believed to be interactive with peptized water swellable clays in aqueous gels, thereby aiding in the formation and maintenance of the disperse phase bodies in a multicolor paint composition of this invention. Hydroxypropyl cellulose is also useful, for example.

The alkali metal carboxy (lower alkyl) cellulose materials employed in the practice of this invention as starting materials are also generally known to the prior art. Presently, a most preferred alkali metal carboxy (lower alkyl) cellulose is sodium carboxy methyl cellulose. One such material that is available commercially is "CMC-7-7H3SF" from the Aqualon Company.

The cationic quaternized cellulose materials employed in the practice of this invention as starting materials are also generally known in the prior art. These polymeric materials are available commercially, for example, from Union Carbide Corporation under the trademark "Polymer JR" or "UCARE Polymer" in a variety of viscosity grades. These materials are also known as, and designated by, the CTFA (that is, the Cosmetic, Toiletry and Fragrance Association, Inc.) as "Polyquaternium-10" which is defined as a polymeric quaternary ammonium salt of hydroxyethyl cellulose that has been reacted with a trimethyl ammonium substituted epoxide. Such a water-soluble cellulose ether is theorized to be interactive with at least one other component present in the disperse phase bodies employed in a paint of the present invention; however, the nature of this interreaction is not now known.

The pigment employed in the practice of this invention as a starting material can be selected from among the various pigments known in the prior art. Preferably, the pigment is in the form of dispersible particles having ultimate particle sizes in the submicron range. The pigment should preferably also be substantially insoluble in water or in organic solvents. While a pigment should have a positive colorant value, it can be organic, inorganic, or a mixture of organic and inorganic materials. If desired, as those skilled in the art will appreciate, the pigment can be prepared preliminarily as a slurry, dispersion, or the like in water and/or organic liquid for purposes of simple mechanical blendability. Particulate metals can be used as pigments.

Presently preferred pigments include, for example, titanium dioxide; lamp black; carbon black; bone black; phthalocyanine blue; phthalocyanine green; various organic and inorganic yellow pigments, such as, for example, D & C yellows including quinoline yellow, yellow iron oxide, and the like; various organic and inorganic red pigments, such as, for example, D & C reds including quinacridone red and red iron oxide, respectively, and the like; etc.

The dispersible, water swellable clays employed in the practice of this invention can be selected from among the various known such clays, both natural and synthetic. Preferably, the clay selected is a silicate which has an ultimate particle size in the submicron range. Examples of suitable clays include synthetic silicate clays resembling hectorite and/or saponite, montmorillonite, beidellite, nontronite, sauconite, stevensite, smectite and other inorganic minerals which are characterized by a tendency to swell by absorbing water between adjacent crystal layers, and to split into fragments capable of forming colloidal dispersions. A presently most preferred silicate clay is a synthetic sodium magnesium lithium silicate hectorite-type clay. This material is obtainable commercially from Waverly Mineral Products of Balacynwyd, Pa. which is a subsidiary of La Porte Inc. of the United Kingdom under the trademark designation "Laponite" RD or RDS. Other suitable hectorite clays are available commercially from the R. T. Vanderbilt Company under the trademark "Veegum T", or from the Baroid Div., National Lead Company under the trademark "Macaloid".

The foregoing clays are employed in the practice of this invention in combination with a water soluble peptizing agent. Such an agent induces the clay to form a stable colloidal aqueous dispersion. Use of such an agent is conventional with such clays. Examples of known water soluble peptizing agents include ammonium hydroxide, hydrogen peroxide, sodium carbonate, sodium citrate, sodium hydroxide, sodium oxalate, sodium silicate, sodium tripolyphosphate, sodium hexametaphosphate, tetrasodium pyrophosphate, and the like. The last named peptizing agent is presently preferred for use in the practice for this invention.

When a Type 2 (two component) polyurethane dispersion is employed, a reactive curative is present, as indicated above, to produce crosslinking. The reactive curative can be and preferably is a water dispersible polyisocyanate. Suitable polyisocyanates are available commercially. Presently, a most preferred polyisocyanate is an aliphatic polyisocyanate that has a molecular weight in the range of about 260 to about 264.

When the polyurethane polymer of a Type 2 dispersion contains carboxyl groups to enhance water dispersability (as is known in the art of polyurethanes), the reactive curative can (in addition to a polyisocyanate) include a wider range of reagents, such as multifunctional epoxy resins, multifunctional carbodiimides, polyfunctional aziridines, mixtures thereof, and the like.

Suitable multifunctional epoxy resins are available commercially.. Such a resin can contain an incorporated amine for imparting water solubility or disperability thereto, a presently needed property. One suitable and presently preferred multifunctional epoxy resin is available commercially as "EPI-REZ WD-510" from the Rhone-Poulenc Company.

The multifunctional carbodiimides and the polyfunctional aziridines can be the same agents as those used to crosslink a crosslinkable carboxylated polymer as described herein.

The multicolor paint compositions of this invention contain, when a crosslinkable carboxylated polymer is present in either the disperse phase or the continuous phase thereof, a crosslinking agent which is effective for crosslinking the carboxylated crosslinkable polymers involved. Preferably, the crosslinking agent is present in the same phase as that in which the crosslinkable carboxylated polymer is present. Suitable water dispersible crosslinking agents for use in this invention which can interreact with such carboxylated polymers at ambient temperatures and pressures are preferably polyfunctional aziridines and multifunctional carbodiimides (the latter class being presently preferred). Such materials are known in the prior art and are available commercially.

Carbodiimides (sometimes also called cyanamides) are a well-known class of organic compounds having the general structure:

where $R_1$ and $R_2$ are each an organic moiety. Carbodiimides crosslink with carboxylic acid groups to form N-acyl ureas.

A presently preferred carbodiimide is available commercially from Union Carbide under the trademark "UCARLNK XL-25 SE" which is designated as "multifunctional" and is designed for use as a low-temperature crosslinking agent for polymers such as carboxylated polymers.

Aziridines are organic compounds based on the ring structure:

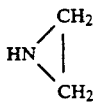

A presently preferred crosslinking polyfunctional aziridine is "ZAMA-7" which is designated "polyfunctional" and is available commercially from Hoechst Celanese and also from Virginia Chemicals. This material also is designed for use as a low-temperature crosslinking agent for polymers such as carboxylated polymers.

As indicated above, the disperse phase bodies and the pigmented, unpigmented or colored continuous phase of this invention preferably each incorporate a water-miscible organic liquid as a cosolvent in combination with the water employed therein. Any convenient water miscible organic liquid can be used, but presently preferred liquids include ester alcohols, such as a material available commercially from Eastman Kodak Company under the trademark "Texanol"; glycol ethers, such as diethylene glycol butyl ether, which is available from Union Carbide Corporation under the trademark "Butyl Carbitol"; and ethylene glycol butyl ether, which is available from Union Carbide Corporation under the trademark "Butyl Cellosolve"; heterocyclics, such as N-methyl-2-pyrrolidone; and the like. N-Pyrrolidine which is available from GAF can also be used.

As can be seen from the foregoing description, in a multicolor water-in-water paint of this invention, a water dispersed polyurethane polymer system is preferably a Type 1, Type 2 or Type 3 with regard to its crosslinkability. Thus, in the case of a Type 1 polymer system, the water dispersed polyurethane polymer system preferably comprises, on a 100 weight percent total crosslinkable polymer solids basis, a water dispersed polyurethane polymer and this polymer is:

(a) comprised of polymer molecules produced by polymerizing mainly monomers which are characterized by containing at least three functional groups per monomer, and wherein said functional groups are selected from the group consisting of isocyanato, hydroxyl, primary amino and secondary amino, and (b) self crosslinkable when dried from an aqueous dispersion at ambient temperatures.

In the case of a Type 2 polymer system, the water dispersed polyurethane polymer system:

(a) preferably comprises on a 100 weight percent total crosslinkable polymer solids basis, a mixture of at least about 75 weight percent of a water dispersed reactable polyurethane polymer with the balance up to 100 weight percent thereof being a water dispersed reactive curative which is reactive with such polymer, and (b) is crosslinkable when dried from an aqueous dispersion at room temperature.

In one Type 2 preference, the reactive curative comprises a water dispersible polyisocyanate.

In another Type 2 preference, the reactable polyurethane polymer has unreacted functional groups and at least some thereof are carboxyl groups and the remainder thereof are selected from the group consisting of isocyanato, hydroxyl, primary amino and secondary amino. Here, the water dispersible reactive curative is preferably selected from the group consisting of water dispersible polyisocyanates, water dispersible multifunctional epoxy resins, water dispersible multifunctional carbodiimides and water dispersible polyfunctional aziridines.

In the case of a Type 3 polymer system, the water dispersed polyurethane polymer system preferably comprises (on a 100 weight percent total crosslinkable polymer solids basis) a water dispersed polyurethane polymer; and the polymer is:

(a) characterized by containing a plurality of terminal isocyanato groups per molecule which are each blocked by an associated blocking agent, and the blocking agent is thermally released from substantially all its associated respective isocyanato groups at a temperature in the range of about 50° to about 150° C., and (b) crosslinkable when dried from an aqueous dispersion, and the blocking agent is thermally released at that temperature.

In a multicolor paint of this invention, the polyurethane polymer system is preferably maintained in a water dispersed state by means of an internal stabilization system that is anionic, as indicated above, and that is also incorporated into a starting water dispersed polyurethane polymer system.

(c) Preparation of Blending Compositions

In preparing a multicolor paint composition of this invention, it is convenient and presently preferred to prepare four compositions initially, which are designated respectively as "Composition A", "Composition B", "Composition C" and "Composition D", each of which is described below.

COMPOSITION A

Composition A is conveniently prepared by preliminarily dissolving the hydroxy (lower alkyl) cellulose (presently preferred) and/or the alkali metal carboxy (lower alkyl) cellulose in a starting water dispersed, inert film-forming crosslinkable polymer system. The carrier liquid is preferably a water/cosolvent mixture. Thereafter, the pigment when used is conveniently dispersed in the resulting mixed dispersion.

A non-polyurethane carboxylated polymer system (as described above) can be alternatively, or additionally but optionally, present with a polyurethane polymer system, in a Composition A in dispersed (preferably dissolved) form. The total amount of water dispersed, film-forming, crosslinkable polymer system employed in a Composition A falls in the range of about 10 to about 45 weight percent (based on 100 weight percent total of a Composition A). However, the amount individually of either polymer system that is employed can range from and including 0 up to about 45 weight percent (same basis) in a Composition A. The amount of crosslinking agent added when this carboxylated polymer is used is preferably at least sufficient to crosslink this polymer when the polymer and the crosslinking agent are dried from an aqueous dispersion at room temperature.

Composition A optionally may also contain a water dispersable, film-forming, crosslinkable, pressure-responsive adhesive as described herein. When present in Composition A, such an adhesive is believed to improve the capability for a multicolor paint composition of this invention to bond to various substrates of widely different compositions. In general, it is now preferred to add less than about 10 weight percent (based on total weight of Composition A) and more preferably less than about 5 weight percent (same basis) of such an adhesive.

Preferably, the adhesive used is water soluble and is a member of the class consisting of acrylic polymers having a butyl acrylate backbone and aliphatic polyurethane polymers having a polyether backbone and more preferably a low $T_g$. The term "acrylic polymer" as used herein includes polymers containing at least about 50 weight percent (on a total polymer weight basis) of an acrylic or acrylate polymerized monomer.

Typically, but preferably, Composition A also includes various optional additives of the type and in the respective amounts conventionally used in paint formulations, such as plasticizers, bonding agents, anti-foaming agents, wetting agents, fungicides, neutralizers, and/or the like. It can be regarded as a feature of the present invention that such additives can be used effectively in a multicolor paint of this invention and can achieve their respective known effects without adversely affecting such desirable paint properties as formulatability, storage stability, applied dried coating water resistance, disperse phase body structural integrity, or the like.

Examples of suitable plasticizers preferably include monomeric plasticizers, such as phthalates like dibutyl phthalate, diisodecyl phthalate, dioctyl phthalate, tricresyl phosphate, butyl benzyl phthalate, and the like. Other suitable monomeric plasticizers can be selected from among the adipates, sebacates, glycolates, castor oils, and the like.

Examples of suitable bonding agents include epoxidized siloxanes, such as a glycidyl silane like glycidoxy trimethoxy silane, and the like.

Examples of suitable anti-foaming agents include the materials available commercially from Henkel under the trademarks "Foamaster VL", "Dehydran 1293", "Nopco NXZ", and the like.

Examples of suitable wetting agents include polycarboxylic acid salts such as are available from Rohm and Haas under the trademark "Tamol" 165 and also the materials that are available commercially from Rohm and Haas under the trademark "Triton", especially the products CF10 and X100.

Colloidal silicas are available commercially from various manufacturers and function as optional flattening agents in paints of this invention.

Various organofunctional silanes and siloxanes are available commercially from various manufacturers and function as property improvers. For example, silanol groups (SiOH) react with organics containing hydroxyl groups and improve a dried coating's water resistance, weathering resistance, and electrical resistance.

The preferred compositional characteristics of a Composition A are shown in Table IV. When, as in Table IV, a composition can contain both a reactive curative (which is in a polyurethane polymer system for purposes of crosslinking) and a crosslinking agent, it will be understood that the amount of crosslinking agent specified is for purposes of causing a carboxylated polymer (not a polyurethane) that is present to crosslink and vice versa with respect to the amount of the reactive curative (if separately calculated) for a polyurethane polymer. However, the amount of reactive curative employed in relation to a given polyurethane polymer is usually not separately shown.

TABLE IV

| | COMPOSITION A | | |
|---|---|---|---|
| | | Weight Percent 100% Basis[1] | |
| Ident. No. | Component | Broad (about) | Preferred (about) |
| 1 | Inert film-forming polymer system | 10–40% | 14–35% |
| 1a | Polyurethane polymer system | (0–40%) | (0–14%) |
| 1b | Carboxylated polymer system | (0–40%) | (0–35%) |
| 2 | Crosslinking agent | (0–10%) | (2.5–3%) |
| 3 | Pressure-responsive adhesive | 0–10% | 0–5% |
| 4 | Hydroxy (alkyl) cellulose and/or alk. metal carboxyl (alkyl cellulose) | 0.5–2% | 0.75–1.25% |
| 5 | Water | 20–80% | 40–65% |
| 6 | Organic cosolvent | 0–15% | 4.0–8.0% |
| 7 | Pigment | 0–30% | 5–20% |
| 8 | Monomeric plasticizer | 0–3% | 1–2% |
| 9 | Bonding agent | 0–0.5% | 0.10–0.3% |
| 10 | Anti-foaming agent | 0–0.5% | 0.10–0.3% |
| 11 | Wetting agent | 0–1.0% | 0.25–0.75% |
| | (Total) | (100.0) | (100.0) |

Table IV Footnote:
[1] Weight ranges enclosed in parentheses are not included in the 100 weight percent total composition basis since such ranges are associated with (i.e., are incorporated with) item 1 (the polymer system).

Characteristically, Composition A preferably has a viscosity that is believed to be in the range of about 15,000 cps to about 25,000 cps (centipoises) measured with a Brookfield viscometer at 25° C. operating at 20 rpm spindle speed with a No. 4 spindle.

Preferably, the water employed in the practice of this invention is filtered and is either deionized or distilled A present preference is to employ a water and organic water-miscible cosolvent medium comprised of about 85 to about 90 weight percent water with the balance up to 100 weight percent on a total solvent composition weight basis thereof being the cosolvent (as characterized above).

COMPOSITION B

Composition B is prepared by dissolving the quaternized cellulose ether in water. The preferred compositional characteristics of Composition B are identified in Table V below:

TABLE V

| | COMPOSITION B | | |
|---|---|---|---|
| | | Weight Percent 100% Basis | |
| Ident. No. | Component | Broad (about) | Preferred (about) |
| 1 | Water | 55–99.5 | 98% |
| 2 | Quaternized cellulose ether | 0.5–5 | 2% |
| | (Total) | (100.0) | (100.0) |

Characteristically, Composition B preferably has a viscosity that is believed to be in the range of about 50,000 to about 55,000 centipoises measured at 25° C. with a Brookfield viscometer using a No. 4 spindle operating at a spindle speed of 20 rpm.

COMPOSITION C

Composition C is prepared by dissolving a peptizing agent in water and then dispersing a water swellable clay in the resulting solution. In general, the respective amount employed of each material is such that the resulting aqueous system forms a gel. As indicated above, the presently most preferred clay is a synthetic sodium magnesium lithium hectorite clay, and the presently most preferred peptizing agent is tetrasodium pyrophosphate.

Composition C is preferably characterized as shown in Table VI:

TABLE VI

| | COMPOSITION C | | |
|---|---|---|---|
| | | Weight Percent 100% Basis | |
| Ident. No. | Component | Broad (about) | Preferred (about) |
| 1 | Water | 88–95% | 89.4% |
| 2 | Clay | 5–10% | 9.5% |
| 3 | Peptizing Agent | 0.5–2% | 1.1% |
| | (Total) | (100.0) | (100.0) |

Characteristically, Composition C preferably has a viscosity that is believed to be in the range of about 80,000 to about 90,000 cps measured at 25° C. with a Brookfield viscometer operating with a No. 4 spindle at a spindle speed of 20 rpm. Characteristically also, Composition C is a thixotropic gel.

COMPOSITION D

Composition D is conveniently and preferably prepared by dissolving the water dispersible, inert film-forming, crosslinkable polyurethane polymer, the water dispersible, film-forming, pressure-responsive crosslinkable adhesive, and other components such as identified in Table VII below in a water/cosolvent mixture. Thereafter, a peptizing agent is dissolved in water, and a water swellable clay is dispersed in the resulting solution which is added to the water/cosolvent mixture. The dispersed, inert film-forming polymer system, as in the case of Composition A, is selected from the group consisting of a polyurethane polymer system, a carboxylated polymer system, and mixtures thereof. However, in the case of Composition D, the dispersed polymer system comprises on a 100 weight percent total dispersed polymer solids basis about 75 to and including 100 weight percent of the polyurethane polymer system, and correspondingly, from and including 0 up to about 25 weight percent of the carboxylated polymer system. Preferably, this polymer system is comprised of the polyurethane polymer system.

The same adhesive preferences apply here that were expressed above in reference to Composition A; however, in general, it is now preferred to add to Composition D up to about 30 weight percent (on a total Composition D weight basis) of the pressure-responsive adhesive, and, more preferably about 5 to about 25%.

Composition D is preferably characterized as shown in Table VIII:

TABLE VIII

| | COMPOSITION D | | |
|---|---|---|---|
| | | Weight Percent 100% Basis[1] | |
| ID | Component | Broad Range | Presently Preferred |
| 1 | Crosslinkable Polymer System | 5–40% | 10–30 |
| 1a | Polyurethane Polymer System | (5–40%) | (15–30%) |
| 1b | Carboxylated Polymer System | (0–8.75%) | (0–7.5%) |
| 2 | Crosslinking agent | (0–3%) | (0–2%) |
| 3 | Pressure-responsive adhesive | 0–30% | 5–25% |
| 4 | Clay | 1.5–5% | 2–4% |
| 5 | Peptizing agent | 0.1–0.8% | 0.15–0.2% |
| 6 | Anti-foaming agent | 0–0.25% | 0.1–0.15% |
| 7 | Wetting agent | 0–0.25% | 0.1–0.15% |
| 8 | Colloidal silica | 0–5% | 0.5–3% |
| 9 | Organofunctional silane | 0–0.25% | 0.04–0.2% |
| 10 | Pigment | 0–30% | 5–20% |
| 11 | Organic cosolvent | 0–15% | 4–8% |
| 12 | Water | 30–70% | 40–65% |
| | TOTAL | (100.00) | (100.00) |

Table VIII Footnote:
[1]Weight ranges enclosed in parentheses are not included in the 100 weight percent total composition basis since such ranges are associated with (i.e., are incorporated with) item 1 (the polymer system).

Characteristically, Composition D has a preferred viscosity that is believed to be in the range of about 500 to about 5,000 centipoises measured at 25° C. with a Brookfield viscometer using a No. 4 spindle at a spindle speed of 20 rpm.

(d) Preferred Blending Procedures

In a water-in-water multicolor paint of this invention, it is now preferred that the total amount of water dispersed, film-forming, crosslinkable, pressure-responsive contact adhesive employed in both the discontinuous and continuous phases fall in the range of about 5 to about 30 weight percent on a 100 weight percent total paint composition basis, and, more preferably, in the range of about 12 to about 25 weight percent. The discontinuous phase preferably contains no more than about 10 weight percent, and the continuous phase no more than about 30 weight percent (same basis). However, at least one of either the discontinuous aqueous phase or the continuous aqueous phase contains such adhesive (in an amount to equal an amount that is in the total weight percent range indicated). As indicated, the adhesive which is preferably selected from the group consisting of polyurethanes and acrylic polymers. Preferably, the adhesive is always present, at least in the continuous phase.

Compositions A, B and C are usable in various combinations to prepare disperse phase compositions which are then broken up under mixing shear force to form disperse phase bodies in a continuous phase comprised of Composition D.

Referring to the flow sheet in the appended drawing, which is submitted to be self-explanatory, it is seen that a Composition A is blended with either Composition B or Composition C, and preferably with both such Compositions B and C, to prepare a disperse phase composition which is homogeneous. The preferred weight ratios of Composition A to such Compositions B and/or C, as the case may be, and also the preferred viscosities of the resulting disperse phase blend homogeneous compositions, are as shown in Table IX below:

TABLE IX

DISPERSE PHASE COMPOSITIONS

| I.D. No. | Disperse Phase Composition of | Preferred Approx. Weight Ratio of Composition A to Other Composition(s) (B or B + C) | Preferred Approx. Viscosity Range (CPS) of Blended Disperse Phase Composition[(1)] |
|---|---|---|---|
| 1 | A + B | 85:15 to 80:20 | 25,000–27,500 |
| 2 | A + C | 85:15 to 80:20 | 30,000–33,000 |
| 3 | A + B + C | 70:15:15 to 80:10:10 | at least 35,000[(2)] |

Table IX Footnotes
[(1)]All viscosities are measured in centipoises at 25° C. with a Brookfield viscometer using a No. 4 spindle operating at 20 rpm.
[(2)]More preferably, this viscosity is not greater than about 85,000 centipoises (so measured).

The disperse phase compositions are conveniently prepared using simple mechanical blending procedures and conventional mixing apparatus with the amount of mixing shear force used being at least sufficient to produce a uniform and homogeneous product blend. As shown in Table IX, the viscosity of a resulting disperse phase composition appears to be characteristically greater than that of the Composition A that is incorporated therein.

As indicated, preferred disperse phase compositions incorporate all three of Compositions A, B and C. While such an (A+B+C) composition can be prepared by any convenient procedure, such as by first blending together Compositions A and B or Compositions A and C, and then further combining with the resulting blend a third Composition (either Composition C or B, as the case may be), it is presently preferred to first mix together Composition A and C in a weight ratio within the range shown in Table IX and then thereafter to mix Composition B therewith using a weight ratio sufficient to achieve a mixing weight ratio as shown in Table IX for all three of Compositions A, B and C.

An (A+B+C) composition characteristically appears to have a viscosity that is greater than either an (A+B) composition or an (A+C) composition. It is theorized, and there is no intent herein to be bound by theory, that the reason for this increase is that the quaternized cellulose ether has reacted in some now unknown manner with at least one component present in the (A+B+C) composition, perhaps with the polyurethane polymer, and, if present, the carboxylated crosslinkable polymer. An (A+B+C) composition, particularly one prepared by the foregoing preferred procedure, appears to have better tack and elasticity characteristics than other such disperse phase compositions.

The (A+B), (A+C) and (A+B+C) disperse phase compositions of the present invention all appear to be novel over all known prior art teachings pertaining to multicolor aqueous disperse phase compositions, and to have higher viscosities than any previously known aqueous pigmentable composition of the type usable for the disperse phase in multicolor paints.

The (A+B), (A+C) and (A+B+C) disperse phase compositions are used to make multicolor paints of the invention by the following procedure:

First, at least two different (A+B), (A+C) or (A+B+C) compositions are each prepared, each preferably being made by the preferred procedure described above. Each (A+B), (A+C) and (A+B+C) composition of the plurality is prepared using a differently colored pigment; thus, each composition has a different apparent color. Preferably, all of the compositions used in any given multicolor paint are of the same type, that is, (A+B), (A+C) and (A+B+C).

Next, the plurality of the different (A+B), (A+C) or (A+B+C) compositions are blended together with a preformed continuous phase composition which is comprised of a clear or pigmented vehicle as in Composition D. In general, Composition D used as a continuous phase in a multicolor paint of this invention should have at the time of blending with (A+B), (A+C), or (A+B+C) compositions a viscosity that is preferably in the range of about 3,000 to about 7,000 cps as measured at 25° C. with a Brookfield viscometer operating at 20 rpm and using a No. 4 spindle. Such viscosity is more preferably in the range of about 5,000 to about 6,000 cps. Composition D preferably should have a viscosity which is less than the viscosity of the starting (A+B), (A+C) or (A+B+C) blends.

In general, the viscosity of the continuous phase is less than the viscosity of the gel phase composition. Preferably, the ratio of the viscosity of the continuous phase composition to the viscosity of each of the disperse phase compositions (comparably measured) is in the range of about 1:5 to about 1:10 with a viscosity ratio range of about 1:7 to about 1:8.5 being presently more preferred.

The respective amounts of the individual (A+B), (A+C) and (A+B+C) compositions employed in a given multicolor paint can be varied according to the artistic preference of the formulator. Preferably, the weight ratio of the total weight of all (A+B), (A+C) and/or (A+B+C) compositions employed in a given multicolor paint of this invention to the weight of Composition D employed in such paint is in the range of about 1:1 to about 6:4, although larger and smaller weight ratios can be used, if desired.

In a product multicolor paint of this invention, such viscosity differences between the discontinuous phase compositions and the continuous phase compositions, and such a total weight ratio of weight of total discontinuous phase compositions to weight of continuous phase composition are now believed to be desirable because such appear to result in production of a product paint wherein the disperse phase bodies form and remain suspended and discrete during subsequent paint storage.

Disperse phase (A+B), (A+C) and (A+B+C) compositions can be blended with a continuous phase composition in any order or manner. During blending, the disperse phase compositions break up and disperse to form discontinuous phase bodies in the continuous phase. The mixing shear force used in the blending is inversely proportional to the average size of the disperse phase bodies formed. The resulting dispersion constitutes a multicolor paint according to this invention.

The discontinuous phase bodies are characterized by what is believed to be unusual and surprisingly greater structural integrity compared to the structural integrity of prior art discontinuous phase bodies, such as the bodies described, for example, in the above-referenced Sellars et al. U.S. Pat. No. 3,950,283.

A continuous phase which includes a crosslinkable Composition D exhibits superior film properties compared to continuous phases of the prior art.

Various mixing procedures can be employed. When, for example, a multicolor paint of this invention is prepared wherein the discontinuous phase color bodies are to have different sizes relative to one another, one can prepare the different sized discontinuous phase bodies in separate mixing operations with different Composition D batches using different mixing shear forces. Thereafter, the different and separately prepared continuous/discontinuous phase dispersion compositions can be blended together. Preferably a mixing shear force is used in such a blending which is not larger than that used to make the largest size disperse phase bodies desired in the resulting mixed dispersions.

Study of the (A+B), (A+C) and (A+B+C) compositions indicates that each is a gel and remains a gel when formed into disperse phase bodies in a multicolor paint composition of the invention. The gel bodies formed from (A+B+C) compositions are believed to have the greatest internal structural integrity or strength.

(e) Product Multicolor Paint Characteristics

Once the (A+B), (A+C) and (A+B+C) compositions are broken up by mixing in a Composition D to form a multicolor paint composition of this invention, the resulting disperse phase bodies apparently cannot and do not separate to reform the respective original (A+B), (A+C) and/or (A+B+C) compositions. Apparently, the disperse phase particles or bodies each have a crosslinked surface and internal structure, and also an interfacial bonding relationship between the continuous phase and the discontinuous phase bodies. No discrete interfacial material layer, such as a shell wall or the like, is believed to exist between the disperse phase bodies and the continuous phase.

Typically, the disperse phase body particle sizes in a multicolor paint of this invention have a size in the range of about 0.2 to about 15 mm, but larger and smaller body or particle sizes can be employed, if desired.

The multicolor paint compositions of this invention are characterized by having indefinitely long storage stability, including shelf, shipping, thermal, and vibrational (mixing) aspects.

While a multicolor paint formulation of this invention characteristically contains at least two distinct colors, those skilled in the art will appreciate that a particular multicolor paint formulation may contain many different classes of distinctly separately colored or noncolored disperse phase bodies, perhaps six or more, each individual identically colored group of discrete disperse phase bodies having been separately preliminarily prepared as an (A+B), (A+C) or (A+B+C) disperse phase composition as hereinabove described, before the disperse phase composition is blended into the continuous phase. Various ratios and proportions of respective (A+B), (A+C) and (A+B+C) compositions relative to one another can be used as desired in blending, as indicated above.

An optional but preferred component of a multicolor paint of this invention is a neutralizer base which is used for reasons of pH control and buffering. Examples of suitable neutralizers include aqueous potassium hydroxide, ammonium hydroxide, triethanolamine, dimethylethanol amine, mixtures thereof, and the like. When employed, the amount of neutralizer used can range from greater than zero up to about 0.6 weight percent on a 100 weight percent total paint composition basis. The neutralizer, when used, can be added at any convenient point during the blending sequence; for example, the neutralizer can be added to Composition A or to the final mixture of gel phase composition and continuous phase at the time when such are being blended together. It is presently preferred to have a product paint composition wherein the continuous phase has a pH in the range of about 8 to about 9 and similarly for the discontinuous (or disperse) phase. The neutralizer can be preliminarily prepared as an aqueous solution or dispersion for ease in blending.

In a product multicolor paint of this invention, at least one of either the total discontinuous phase or the continuous phase thereof can optionally contain from and including 0 to about 25 weight percent on a 100 weight percent total phase basis of water dispersed, inert film-forming carboxylated polymer (as described above) plus sufficient water dispersed crosslinking agent (as described above) to crosslink this carboxylated polymer when the carboxylated polymer and the crosslinking agent are dried from an aqueous dispersion at room temperature. Usually the total amount of this crosslinking polymer in both phases of a product multicolor paint is not more than about 3 weight percent on a total 100 weight percent product paint basis.

The compositional characteristics for a preferred and illustrative class of multicolor paint compositions of this invention (expressed on a total composition basis) are summarized in Table X below:

TABLE X

MULTICOLORED PAINT COMPOSITIONS

| | | Weight Percent 100% Basis[1] | |
|---|---|---|---|
| ID | Component | Presently Most Preferred | Preferred Range (About) |
| 1 | Inert film-forming polymer system (Total) | 22.5% | 8–30% |
| 1a | Polyurethane polymer system | (7%) | (15–30%) |
| 1b | Carboxylated polymer system | (15.5%) | (0–30%) |
| 2 | Pressure-responsive contact adhesive | 20.00% | 12–25% |
| 3 | Hydroxy (alkyl) cellulose | 0.35% | 0.3–1.25% |
| 4 | Pigment | 8.0% | 2–20% |
| 5 | Quaternized cellulose ether | 0.15% | 0.05–2% |
| 6 | Colloidal silica | 1.2% | 0.5–3% |
| 7 | Clay | 3.0% | 0.1–10% |
| 8 | Peptizing agent | 0.35% | 0.1–1.0% |
| 9 | Organofunctional silane | 0.01% | 0.002–0.015% |
| 10 | Organic cosolvent | 7.25% | 1.5–7.5% |
| 11 | Water | 39.5% | 20–75% |
| 12 | Wetting agent | 0.25% | 0.10–0.50% |
| 13 | Anti-foaming agent | 0.15% | 0.05–0.50% |
| 14 | Bonding agent | 0.1% | 0.05–0.25% |
| 15 | Neutralizer | 0.2% | 0.05–0.50% |
| | (Total Weight Percent) | (100.0) | (100.0) |

Table X Footnote:
[1]Weight ranges enclosed in parentheses are not included in the 100 weight percent total composition basis since such ranges are associated with (i.e., are incorporated with) item 1 (the polymer system).

The excellent strength and stability characteristics of a multicolored paint composition of this invention provide a composition which can be brushed, rolled or sprayed using the relatively high shear forces that are characteristically exerted upon a paint formulation being so applied without appreciable disperse phase color body breakdown.

It will be appreciated that a multicolor paint composition of the present invention can generally be applied by any conventional application method desired utilizing spraying, brushing, roller, pad, or the like.

As the applied paint coating dries on a surface, the inert film-forming polyurethane polymer in combination with the other components present form a continuous film or coating in which the disperse phase bodies become located typically in adjacent but spaced, discrete relationship to one another. Both the water and the organic cosolvent (if present) evaporate. The resulting coating becomes substantially fully crosslinked.

It is a surprising feature and an advantage of the present invention that, when a paint composition of this invention is applied, for example, by a roller applicator or the like, to a substrate, the paint composition transfers quickly from the applicator to the substrate. Desirable multicolor paint quality characteristics including especially the stability characteristics of the disperse phase color bodies are not adversely affected by such a rapid transfer. Indeed, this transfer appears to avoid damage to the disperse phase bodies since back and forth applicator stroking against the freshly painted substrate surface as in the prior art appears sometimes to induce some damage to the disperse phase bodies.

It is an additional surprising feature and an advantage of the present invention that when a paint composition of this invention has been applied to a substrate surface and allowed to dry preferably in ambient air, the resulting multicolored coating displays inert film characteristics and is substantially non-tacky even though the pressure-sensitive adhesive has been incorporated thereinto.

A product dried coating displays excellent properties, such as water resistance, as well as abrasion (wear) resistance, thermal stability, washability, surface smoothness, and the like.

EMBODIMENTS

The invention is further illustrated by the following Examples.

EXAMPLES 1 and 2

Preparation of First and Second "Composition "A"

Two embodiments of "Composition A" are prepared by blending together the following components in the respective amounts indicated using a Cowles blade operating at about 450 to about 1500 rpm in a mixer:

TABLE XI

| FIRST & SECOND "COMPOSITION A" | | |
|---|---|---|
| Component | Ex. 1 | Ex. 2 |
| Dispersed Polyurethane Polymer (QW-18-1) | 58.17 | 48.17 |
| Dispersed Carboxylated Polymer (Pliolite 7103) | — | 10.00 |
| Water | 27.38 | 27.38 |
| Wetting agent (TAMOL 165) | 0.50 | 0.50 |
| Anti-foaming agent (NOPCO NXZ) | 0.50 | 0.50 |
| Hydroxyethyl cellulose (Cellosize QP-100-MH) | 1.00 | 1.00 |
| Titanium dioxide (Dupont R-900) | 10.00 | — |
| Bone black (Ebonex 3D) | — | 8.20 |
| Barium sulfate (Barytes) | — | 1.80 |
| Organo functional silane (A-187) | 0.20 | 0.20 |
| Carbodiimide (UCARLNK XL-25-SE) | 2.00 | 2.00 |
| Ammonium hydroxide (28% Ammonia) | 0.25 | 0.25 |
| (Total Weight Percent) | (100.00) | (100.00) |

In Table XI, the "Composition A" of Example 1 is white in color and its Brookfield viscosity is believed to be in the range of about 10,000 to about 25,000 cps measured at 25° C. using a No. 4 spindle operating at 20 rpm; and the "Composition A" of Example 2 is black in color and its Brookfield viscosity is believed to be in the range of about 10,000 to about 30,000 cps similarly measured.

EXAMPLE 3

Preparation of Clear "Composition A"

A clear "Composition A" is prepared by blending together the following indicated components in the respective amounts indicated using a Cowles blade operating at about 450 to about 1500 rpm in a mixer.

TABLE XII

| CLEAR "COMPOSITION A" | |
|---|---|
| Component | Ex. 3 |
| Dispersed Acrylic Polymer (Pliolite 7103) | 66.0 |
| Adhesive D | 2.00 |
| Water | 33.0 |
| Wetting agent (TAMOL 165) | 0.50 |
| Anti-foaming agent (NOPCO NXZ) | 0.50 |
| Hydroxyethyl cellulose (Cellosize QP-100-MH) | 1.00 |
| Silica (OK 412) | 2.50 |
| Organo functional silane (A-187) | 0.20 |
| Carbodiimide (UCARLNK XL-25-SE) | 2.00 |
| Ammonium hydroxide (28% Ammonia) | 0.25 |
| (Total Weight Percent) | (100.00) |

Adhesive D is as identified in Example 6 below.

The "Composition A" of Example 3 is clear and its Brookfield viscosity is believed to be in the range of about 10,000 to about 20,000 cps measured at 25° C. using a No. 4 spindle operating at 20 rpm.

EXAMPLE 4

Preparation of "Composition B"

A "Composition B" is prepared by blending together the following components in the respective amounts indicated using a Cowles blade operating at about 1000 to about 2500 rpm in a mixer:

TABLE XIII

| COMPOSITION B | |
|---|---|
| Water | 98.00 |
| Quaternized cellulose ether Polyquaternium-10 (UCARE Polymer JR-30) | 2.00 |
| (Total Weight Percent) | (100.00) |

The Brookfield viscosity of the resulting "Composition B" is about 50,000 cps measured at 25° C. using a No. 4 spindle operating at 20 rpm.

EXAMPLE 5

Preparation of "Composition C"

A "Composition C" is prepared by blending together the following components in the respective amounts indicated using a Cowles blade operating at about 750 to about 2000 rpm in a mixer:

TABLE XIV

| COMPOSITION C | |
|---|---|
| Water | 89.40 |
| Synthetic sodium magnesium lithium hectorite clay (Laponite RDS) | 9.50 |
| Peptizing agent (tetrasodium pyrophosphate) | 1.10 |
| (Total Weight Percent) | (100.00) |

The Brookfield viscosity of the resulting "Composition C" is about 85,000 cps measured at 25° C. using a No. 4 spindle operating at 20 rpm.

EXAMPLE 6

Preparation of "Composition D"

Various different "Compositions D" are prepared which are, respectively, clear, pigmented, metallic or dyed with a transparent dye. These components are prepared by blending together the following components in the respective amounts indicated using a Cowles blade operating at about 750 to about 1,500 rpm in a mixer.

The same water dispersible, film-forming, crosslinkable polyurethane polymer that is employed in the discontinuous phase (see Examples 1 and 2 of Composition A) is preferably used in preparing "Composition D" (i.e., QW18-1). The addition of such a polymer to a "Composition D" that contains an adhesive results in a multicolor paint that has a more impregnable film with a higher solids content and better hiding properties relative to a paint which includes a corresponding "Composition D" that is formed as taught in Ser. No. 851,525.

The use of the foregoing polymers in a "Composition D" that is incorporated into a multicolor paint with an adhesive also provides a more homogeneous paint film which improves the drying speed, the sheen control, washability, durability and water resistance of the final coating. When the foregoing polymer is crosslinked, a high degree of hardness, mar resistance, chemical resistance and thermal stability is provided. The resulting multicolor paint can be rapidly applied as a surface coating with a paint roller or brush and can be sprayed with spray equipment.

Various Composition D formulations are shown in Table XV below (all quantities are expressed on a 100 weight percent total composition basis):

TABLE XV

| | COMPOSITION D EXAMPLES | | | |
|---|---|---|---|---|
| | Clear Ex. 6a | Pigmented Ex. 6b | Metallic Ex. 6c | Transparent Dye Ex. 6d |
| Polyurethane Polymer | 15.07 | 15.07 | 23.57 | 16.07 |
| Carboxylated Polymer | 2.00 | 2.00 | | |
| Adhesive A | 20.00 | | | |
| Adhesive B | | 20.00 | | |
| Adhesive C | | | 20.00 | |
| Adhesive D | | | | 20.00 |
| Adhesive E | 10.00 | | | |
| Adhesive F | | | | 10.00 |
| Water | 44.70 | 44.70 | 44.70 | 44.70 |
| Clay | 4.75 | 4.75 | 4.75 | 4.75 |
| Peptizing agent | 0.55 | 0.55 | 0.55 | 0.55 |
| Anti-foaming agent (NOPCO NXZ) | 0.15 | 0.15 | 0.15 | 0.15 |
| Wetting agent (TAMOL 165) | 0.15 | 0.15 | 0.15 | 0.15 |
| Silica (OK412) | 2.50 | 2.50 | 2.50 | 2.50 |
| Organo functional silane (A-187) | 0.13 | 0.13 | 0.13 | 0.13 |
| Titanium dioxide (Dupont R-900) | — | 10.00 | — | — |
| Water miscible aluminum paste (Staphydro-Lac W-60-NL) | — | — | 2.50 | — |
| Organic cosolvent (Butyl Cellosolve) | — | — | 1.00 | — |
| Water miscible dye (NEROSOL Yellow R) | — | — | — | 1.00 |
| (Total Weight Percent) | (100.00) | (100.00) | (100.00) | (100.00) |

In the foregoing Table, "Adhesive A" comprises "Robond PS-20" which is a trademark of Rohm and Haas Company, Philadelphia, Pa. for an aqueous acrylic pressure-sensitive adhesive which has a milky white appearance, a solids content of about 53% on a 100 weight percent total composition basis and a pH of about 9.0 to 9.5. This adhesive is film-forming and is characterized by relatively low peel adhesion and tack, but has high shear resistance.

"Adhesive B" in the foregoing Table comprises a mixture of "Robond PS-20" with "Luhydran A-848-S" in a 4:1 weight ratio. "Luhydran A-848-S" is a trademark of BASF Corporation Chemicals Division, Parsippany, N.J. for an aqueous milky white methacrylic acid ester polymer dispersion which contain about 40 weight percent of this polymer with the balance up to 100 weight percent being water, and which has a pH of about 7.5. This adhesive is film-forming and is useful as a binder in water based coatings.

"Adhesive C" in the foregoing Table comprises "Robond PS-83-D" which is a trademark of the Rohm and Haas Company for an aqueous acrylic pressure-sensitive adhesive copolymer which has a milky-white appearance, a solids content of about 53% on a 100 weight percent total composition basis and a pH of about 9.1 to 9.8. This adhesive incorporates as one major monomer butyl acrylate. This adhesive is film-forming and displays a balance of peel adhesion, quick stick and shear resistance.

"Adhesive D" in the foregoing Table comprises "Robond PS-83-D" and "Luhydran A-848-S" in a 4:1 weight ratio.

"Adhesive E" in the foregoing Table comprises "QThane LQW 10-207" which is a trademark of the K. J. Quinn & Company, Inc. for a translucent aliphatic single component water based polyurethane dispersion with adhesive properties and green strength. The dispersion contains about 40 weight percent solids with the balance up to 100 weight percent being water and the dispersion has a pH of about 7.5. The dispersion and its polymer may be further crosslinked with aziridines.

"Adhesive F" in the foregoing Table comprises "QThane" LQW10-207" and "Luhydran A-848-S" in a 4:1 weight ratio.

The Brookfield viscosity of each resulting above "Composition D" of Table XV is in the range of about 1,000 to about 1,500 cps measured at 25° C. using a No. 4 spindle operating at 20 rpm.

EXAMPLE 7

Preparation of First Disperse Phase Gel Composition

A first disperse phase gel composition is prepared by blending together the following indicated amounts of each of Examples 1 and 4 using a Cowles blade operating at about 800 to about 1500 rpm in a mixer:

| | |
|---|---|
| "Composition A" Example 1 (white) | 82.40 wt % |
| "Composition B" Example 4 | 17.60 wt % |
| (Total Weight Percent) | (100.00) |

The Brookfield viscosity of the resulting gel composition is about 26,000 cps measured at 25° C. using a No. 4 spindle operating at 20 rpm.

EXAMPLE 8

Preparation of First Disperse Phase Gel Composition

A first disperse phase gel composition is prepared by blending together the following indicated amounts of each of Examples 1 and 5 using a Cowles blade operating at about 1000 to about 2000 rpm in a mixer:

| | |
|---|---|
| "Composition A" Example 1 (white) | 82.40 wt % |
| "Composition C" Example 5 | 17.60 wt % |
| (Total Weight Percent) | (100.00) |

The Brookfield viscosity of the resulting gel composition is about 31,000 cps measured at 25° C. using a No. 4 spindle operating at 20 rpm.

EXAMPLE 9

Preparation of First Disperse Phase Gel Composition

A first disperse phase gel composition is prepared by blending together the following indicated amounts of each of Examples 1, 4 and 5 using a Cowles blade operating at about 1000 to about 2500 rpm in a mixer:

| | |
|---|---|
| "Composition A" Example 1 (white) | 70.00 wt % |
| "Composition B" Example 4 | 15.00 wt % |
| "Composition C" Example 5 | 15.00 wt % |
| (Total Weight Percent) | (100.00) |

The Brookfield viscosity of the resulting gel composition is about 35,000 cps measured at 25° C. using a No. 4 spindle operating at 20 rpm.

EXAMPLE 10

Preparation of Second Disperse Phase Gel Composition

A second disperse phase gel composition is prepared by blending together the following indicated amounts of each of Examples 2 and 4 using a Cowles blade operating at about 800 to 1500 rpm in a mixer:

| | |
|---|---|
| "Composition A" Example 2 (black) | 82.40 wt % |
| "Composition B" Example 4 | 17.60 wt % |
| (Total Weight Percent) | (100.00) |

The Brookfield viscosity of the resulting gel composition is about 29,500 cps measured at 25° C. using a No. 4 spindle operating at 20 rpm.

EXAMPLE 11

Preparation of Second Disperse Phase Gel Composition

A second disperse phase gel composition is prepared by blending together the following indicated amounts of each of Examples 2 and 5 using a Cowles blade operating at about 1000 to about 2000 rpm in a mixer:

| | |
|---|---|
| "Composition A" Example 2 (black) | 82.40 wt % |
| "Composition C" Example 5 | 17.60 wt % |
| (Total Weight Percent) | (100.00) |

The Brookfield viscosity of the resulting gel composition is about 32,000 cps measured at 25° C. using a No. spindle operating at 20 rpm.

EXAMPLE 12

Preparation of Second Disperse Phase Gel Composition

A second disperse phase gel composition is prepared by blending together the following indicated amounts of each of Examples 2, 4 and 5 using a Cowles blade operating at about 1000 to about 2500 rpm in a mixer:

| | |
|---|---|
| "Composition A" Example 2 (black) | 70.00 wt % |
| "Composition B" Example 4 | 15.00 wt % |
| "Composition C" Example 5 | 15.00 wt % |
| (Total Weight Percent) | (100.00) |

The Brookfield viscosity of the resulting gel composition is about 37,500 cps measured at 25° C. using a No. spindle operating at 20 rpm.

EXAMPLE 13

Preparation of Third Disperse Phase Gel

A clear third disperse phase gel composition is prepared by blending together the following indicated amounts of each using a Cowles blade operating at about 1,000 to about 2,500 rpm in a mixer:

| | |
|---|---|
| "Composition A" Example 3 | 70.00 wt % |
| "Composition B" Example 4 | 15.00 wt % |
| "Composition C" Example 5 | 15.00 wt % |
| (Total Weight Percent) | (100.00) |

The Brookfield viscosity of the resulting clear gel composition is about 35,000 cps measured at 25° C. using a No. 4 spindle operating at 20 rpm.

EXAMPLES 14–17

Preparation of Multicolor Paint Including Composition D as the Continuous Phase

Multicolor paints are prepared by mixing the quantity of Composition D shown in the following Table XVI with each of the respective specified previously described and prepared intermediate composition. All components for each paint are expressed on a 100 weight percent total composition basis.

TABLE XVI

| | Ex. 14 White & Black | Ex. 15 Black Metallic | Ex. 16 Transparent Yellow Metallic | Ex. 17 Black & White |
|---|---|---|---|---|
| Composition D clear | — | — | — | 46.60 |

TABLE XVI-continued

|  | Ex. 14 White & Black | Ex. 15 Black Metallic | Ex. 16 Transparent Yellow Metallic | Ex. 17 Black & White |
|---|---|---|---|---|
| (Ex. 6a) Composition D pigmented | 46.60 | — | — | — |
| (Ex. 6b) Composition D metallic | — | 22.80 | — | — |
| (Ex. 6c) Composition D transparent dye (Ex. 6d) | — | — | 22.80 | — |
| First disperse phase gel (white) Examples 7, 8 and 9 | 46.60 | — | — | 46.60 |
| Second disperse phase gel (black) Examples 10, 11 and 12 | — | — | — | 46.60 |
| Third disperse phase gel (clear) Example 13 | — | 22.80 | 22.80 | — |
| Composition D clear (Ex. 6a) | 1.20 | 25.00 | — | 1.20 |
| Composition D pigmented (Ex. 6b) | — | — | — | — |
| Composition D metallic (Ex. 6c) | — | — | 25.00 | — |
| Composition D transparent dye (Ex. 6d) | — | — | — | — |
| First disperse phase gel (white) Examples 7, 8 and 9 | — | — | — | — |
| Second disperse phase gel (black) Examples 10, 11 and 12 | 1.20 | 25.00 | — | 1.20 |
| Third disperse phase gel (clear) Example 13 | — | — | 25.00 | — |
| Butyl benzyl phthalate (Santicizer 160) | 1.00 | 1.00 | 1.00 | 1.00 |
| Ester Alcohol (TEXANOL) | 1.00 | 1.00 | 1.00 | 1.00 |
| Ethylene glycol butyl ether (Butyl Cellosolve) | 2.40 | 2.40 | 2.40 | 2.40 |

Throughout the preparation of the multicolor paints of Examples 14–17, a Cowles blade in a mixer operates in the range of about 400 to about 500 rpm. The Brookfield viscosity of the product multicolor paint is in the range of about 5,000 to about 7,000 cps measured at 25° C. using a No. 4 spindle operating at 20 rpm.

The foregoing multicolor paints exhibit the improved properties discussed above with reference to Example 6. The paint can be applied as a surface coating with a paint roller or brush and can be sprayed with spray equipment as described below.

EXAMPLE 18

Application of the Multicolor Paint

Each of the multicolor paints of the Examples 14–17 is applied using each of:

(1) roller application using a foam roller at 30–60 pps (pores per square inch);

(2) brush application using a foam, synthetic or bristle type brush;

(3) a conventional air spray set up with a pressurized feed tank and dual regulators. Binks Gun Model 2001 with an internal or external mix air nozzle assembly. Air pressures with an internal mix assembly: gun pressure, 30 psi and material air pressure 35 psi. With external mix nozzle assembly, air pressure at the gun is about 20 to 30 about psi and air pressure of the material is about 10 to about 15 psi;

(4) most airless sprayers. Pump type Graco Model PT2500 with 221–517 tip size and using application pressures of about 200 psi at the gun tip; and (5) H.V.L.P. spray equipment (high volume, low pressure). (Wagner Cap Spray Units CS5000 and CS8000).

It is found that a uniform multicolor coating is produced from each paint. This coating is applied rapidly from the roller and the brush. Each coating dries to a tack-free film (or coating) in about 30 minutes in air. Maximum inert film properties are attainable after an additional post-curing time of about 96 hours in air.

Each cured coating is found to pass the ASTM No. D-1308-79 water spot test, both opened and covered.

Drying time of a coated paint can be accelerated by forced air drying at 125°–150° F.

EXAMPLES 19 THROUGH 34

Other Embodiments

When each of the water soluble, inert film-forming, crosslinkable polyurethane polymeric dispersions shown in Table XVI below is substituted for the polyurethane polymer employed in Examples 1 and 2, and then when each of such resulting "Compositions A" is used to prepare multicolor paints as described in the procedures of foregoing Examples, a multicolor paint is produced which, when coated as described in Example 18, is found to pass the water spot tests of ASTM D-1308-79. All components for each paint are expressed on a 100 weight percent total composition basis.

TABLE XVII

Other Embodiments Using Crosslinkable Water Soluble Polymers

| | Example No. | | | | | | | | | |
|---|---|---|---|---|---|---|---|---|---|---|
| | 19 | 20 | 21 | 22 | 23 | 24 | 25 | 26 | 27 | 28 |
| Water | 37.85 | 37.85 | 42.02 | 50.76 | 42.02 | 41.95 | 37.85 | 45.35 | 42.85 | 42.85 |
| Wetting agent (TAMOL 165) | 0.50 | 0.50 | 0.50 | 0.50 | 0.50 | 0.50 | 0.50 | 0.50 | 0.50 | 0.50 |
| Anti-foaming agent (NOPCO NXZ) | 0.20 | 0.20 | 0.20 | 0.20 | 0.20 | 0.20 | 0.20 | 0.20 | 0.20 | 0.20 |
| Hydroxyethyl cellulose (Cellosize QP-100-MH) | 1.00 | 1.00 | 1.00 | 1.00 | 1.00 | 1.00 | 1.00 | 1.00 | — | — |
| Titanium dioxide (Dupont R-900) | 10.00 | 10.00 | 10.00 | 10.00 | 10.00 | 10.00 | 10.00 | 10.00 | 10.00 | 10.00 |
| Polyurethane dispersion | | | | | | | | | | |
| Aliphatic QW-10 | 37.50 | | | | | | | | | |
| Aliphatic QW-12 | | 37.50 | | | | | | | | |
| Aliphatic QW-14 | | | 33.33 | | | | | | | |
| Aliphatic QW-16 | | | | 24.59 | | | | | | |
| Sancure 815 | | | | | 33.33 | | | | | |
| Sancure 878 | | | | | | 33.40 | | | | |
| Sancure 849 | | | | | | | 37.50 | | | |

TABLE XVII-continued

| | | | | | | | | | | |
|---|---|---|---|---|---|---|---|---|---|---|
| Sancure 895 | | | | | | | 30.00 | | | |
| Sancure 899 | | | | | | | | 40.00 | — | |
| Waterborne aliphatic urethane "Sancure" 898 | | | | | | | | | | |
| Waterborne aliphatic urethane "Q-Thane" QW-18 | | | | | | | | | — | 40.00 |
| Butyl benzyl phthalate (Santicizer 160) | 1.50 | 1.50 | 1.50 | 1.50 | 1.50 | 1.50 | 1.50 | 1.50 | — | — |
| Organo functional silane (A-187) | 0.20 | 0.20 | 0.20 | 0.20 | 0.20 | 0.20 | 0.20 | 0.20 | 0.20 | 0.20 |
| Ester alcohol (TEXANOL) | 1.25 | 1.25 | 1.25 | 1.25 | 1.25 | 1.25 | 1.25 | 1.25 | — | — |
| Ethylene glycol butyl ether (Butyl Cellosolve) | 3.50 | 3.50 | 3.50 | 3.50 | 3.50 | 3.50 | 3.50 | 3.50 | — | — |
| Carbodiimide (UCARLNK XL-25-SE) | 6.00 | 6.00 | 6.00 | 6.00 | 6.00 | 6.00 | 6.00 | 6.00 | 6.00 | 6.00 |
| Ammonium hydroxide (28% Ammonia) | 0.50 | 0.50 | 0.50 | 0.50 | 0.50 | 0.50 | 0.50 | 0.50 | 0.25 | 0.25 |
| (Total Weight Percent) | (100.00) | (100.00) | (100.00) | (100.00) | (100.00) | (100.00) | (100.00) | (100.00) | (100.00) | (100.00) |

Other Embodiments Using Crosslinkabled Water Soluble Polymers

| Example No. | 29 | 30 | 31 | 32 | 33 | 34 |
|---|---|---|---|---|---|---|
| Water | 35.85 | 35.85 | 35.85 | 35.85 | 35.85 | 35.85 |
| Wetting agent (TAMOL 165) | 0.50 | 0.50 | 0.50 | 0.50 | 0.50 | 0.50 |
| Anti-foaming agent (NOPCO NXZ) | 0.20 | 0.20 | 0.20 | 0.20 | 0.20 | 0.20 |
| Hydroxyethyl cellulose (Cellosize QP-100-MH) | 1.00 | 1.00 | 1.00 | 1.00 | 1.00 | 1.00 |
| Titanium dioxide (Dupont R-900) | 10.00 | 10.00 | 10.00 | 10.00 | 10.00 | 10.00 |
| Adhesive A (Robond PS20) | 20.00 | | | | | |
| Adhesive B (PS-20 with A-848-S) | | 20.00 | | | | |
| Adhesive C (Robond PS-83-D) | | | 20.00 | | | |
| Adhesive D (Robond PS83D with A-848-S) | | | | 20.00 | | |
| Adhesive E (Qthane LQW 10-207) | | | | | 20.00 | |
| Adhesive F (Qthane LQW 10-207 with A-848-S) | | | | | | 20.00 |
| Aliphatic urethane (Q-thane QW-18) | 20.00 | 20.00 | 20.00 | 20.00 | 20.00 | 20.00 |
| Butyl benzyl phthalate (Santicizer 160) | 1.50 | 1.50 | 1.50 | 1.50 | 1.50 | 1.50 |
| Organo functional silane (A-187) | 0.20 | 0.20 | 0.20 | 0.20 | 0.20 | 0.20 |
| Ester alcohol (TEXANOL) | 1.25 | 1.25 | 1.25 | 1.25 | 1.25 | 1.25 |
| Ethylene glycol butyl ether (Butyl Cellosolve) | 3.00 | 3.00 | 3.00 | 3.00 | 3.00 | 3.00 |
| Carbodiimide (UCARLNK XL-25-SE) | 6.00 | 6.00 | 6.00 | 6.00 | 6.00 | 6.00 |
| Ammonium hydroxide (28% Ammonia) | 0.50 | 0.50 | 0.50 | 0.50 | 0.50 | 0.50 |
| (Total Weight Percent) | (100.00) | (100.00) | (100.00) | (100.00) | (100.00) | (100.00) |

In the foregoing Examples, the hydroxyethyl cellulose can be replaced with: A) hydroxymethyl cellulose (Dow A type); B) hydroxypropyl cellulose (Aqualon Klucel S97A type); and C) sodium carboxy methyl cellulose (Aqualon CMC-7-7H3SF). The carbodiimide crosslinker can be replaced by the polyfunctional aziridine crosslinking agent "Zama-7" from Virginia chemicals. The "Composition C" hectorite clay (Laponite RDS) can be replaced by: A) Laponite RD; B) Veegum T; and C) Macaloid. And the "Composition C" peptizing agent (tetrasodium pyrophosphate) can be replaced by: A) sodium pyrophosphate; B) sodium tripolyphosphate; and C) sodium hexametaphosphate.

While the foregoing description makes use of illustrative examples of various types, no limitations upon the present invention are to be implied or inferred therefrom.

What is claimed is:

1. A method, for making a water-in-water multicolor paint having a discontinuous aqueous phase dispersed in a continuous aqueous phase, said method comprising the steps of:
   (A) providing a first composition comprising on a 100 weight percent basis:
   (a) about 10 to about 40 weight percent of a water dispersed, film-forming, crosslinkable, polymer system selected from the group consisting of a polyurethane polymer system, a carboxylated polymer system and mixtures thereof, said polyurethane polymer system comprising on a 100 weight percent total crosslinkable solids basis about 75 to and including 100 weight percent of polyurethane polymer and correspondingly from and including 0 to about 25 weight percent of reactive curative, and said carboxylated polymer system comprising on a 100 weight percent total polymer solids basis about 75 to and including 100 weight percent carboxylated polymer and correspondingly from and including 0 up to about 25 weight percent of organic crosslinking agent;
   (b) about 0.5 to about 2 weight percent dissolved cellulose material selected from the class consisting of hydroxy (lower alkyl) cellulose and alkali metal carboxylated (lower alkyl) cellulose,
   (c) from and including 0 to about 10 weight percent of water dispersed, film-forming, crosslinkable pressure-sensitive contact adhesive selected from the group consisting of polyurethanes and acrylic polymers,
   (d) from and including 0 to about 30 weight percent dispersed pigment,
   (e) from and including 0 to about 10 weight percent organic cosolvent, and
   (f) about 20 to about 80 weight percent water;

(B) providing a second composition comprising on a 100 weight percent basis:
  (a) about 0.5 to about 5 weight percent dissolved cationic quaternized cellulose ether, and
  (b) about 95 to about 99.5 weight percent water;
(C) providing a third composition comprising on a 100 weight percent basis:
  (a) about 0.5 to about 2 weight percent dissolved peptizing agent,
  (b) about 5 to about 10 weight percent dispersed water swellable clay, and
  (c) about 88 to about 95 weight percent water;
(D) providing a fourth composition comprising on a 100 weight percent basis:
  (a) about 5 to about 40 weight percent of said water dispersed, film-forming, crosslinkable polymer system,
  (b) from and including 0 to about 30 weight percent of a water dispersed, film-forming, crosslinkable pressure-sensitive contact adhesive selected from the group consisting of polyurethanes and acrylic polymers,
  (c) about 1.5 to about 5 weight percent of said dispersed water swellable clay,
  (d) about 0.1 to about 0.8 weight percent of said dissolved peptizing agent,
  (e) from and including 0 to about 30 weight percent of pigment,
  (f) from and including 0 to about 0.25 weight percent of anti-foaming agent,
  (g) from and including 0 to about 0.25 weight percent of a wetting agent,
  (h) from and including 0 to about 0.25 weight percent of an organofunctional silane,
  (i) from and including 0 to about 5 weight percent of colloidal silica,
  (j) from and including 0 to about 15 weight percent of an organic cosolvent, and
  (k) about 30 to about 70 weight percent water,
the relationship between components of said fourth composition being such that said fourth composition has a viscosity in the range of about 1,000 to about 1,500 centipoises;
(E) blending said first composition with a composition selected from the group consisting of:
  (a) said second composition in the weight ratio range of about 85:15 through about 80:20 of said first composition to said second composition,
  (b) said third composition in the weight ratio range of about 85:15 to about 80:20 of said first composition to said third composition, and
  (c) a composition of said second composition and said third composition in the weight ratio range of about 70:15:15 to about 80:10:10 of said first composition to said second composition to said third composition so as to produce a first disperse phase gel composition having a viscosity in the range of about 25,000 to about 85,000 centipoises; and
(F) mixing said first disperse phase gel composition with said fourth composition with said adhesive being present in at least one of said first compositions or said fourth composition the ratio of the viscosity of said fourth composition to the viscosity of said first disperse phase composition being in the range of about 1:5 to about 1:10, the mixing shear force used in said mixing being sufficient to break up said first disperse phase gel composition into discrete gel bodies thereby forming said discontinuous aqueous phase which is dispersed in said fourth composition as said continuous aqueous phase, said mixing shear force being inversely proportional the average size of said so formed disperse phase bodies, thereby to produce said multicolor paint.

2. The method of claim 1 wherein said inert film-forming polymer system comprises a water dispersed polyurethane polymer system which is:
  (a) comprised of polyurethane polymer molecules produced by polymerizing mainly monomers which are characterized by containing at least three functional groups per monomer, and wherein said functional groups are selected from the group consisting of isocyanato, hydroxyl, primary amino and secondary amino, and
  (b) self crosslinkable when dried from an aqueous dispersion of ambient temperatures, and wherein said pressure-sensitive adhesive comprises a polyurethane.

3. The method of claim 1 wherein said adhesive is selected from the group consisting of acrylic polymers having a butyl acrylate backbone and aliphatic polyurethane polymers having a polyether backbone.

4. The method of claim 1 wherein said adhesive comprises a water dispersed acrylic adhesive having a butyl acrylate backbone.

5. The method of claim 1 wherein said adhesive comprises an aliphatic polyurethane polymer having a polyether backbone.

6. The method of claim 2 wherein each said polyurethane polymer has unreacted but reactable functional groups and
  at least some of said groups are carboxyl groups, and
  the remainder of said groups are selected from the group consisting of isocyanato, hydroxyl, primary amino, and secondary amino, and wherein said reactive curative is water dispersed and is selected from the group consisting of polyisocyanates, multifunctional epoxy resins, multifunctional carbodiimides water dispersible polyfunctional aziridines, and mixtures thereof.

7. The method of claim 1 wherein said water dispersed inert film-forming polymer system comprises a water dispersed polyurethane polymer which is:
  (a) characterized by containing a plurality of terminal isocyanato groups per molecule which are each blocked by an associated blocking agent, and said blocking agent is thermally released from substantially all its associated respective isocyanato groups at a temperature in the range of about 50° to about 150° C., and
  (b) crosslinkable when dried from an aqueous dispersion and said blocking agent is so thermally released at said temperature.

8. The method of claim 1 wherein, when in said water dispersed inert film-forming polymer system said carboxylated polymer system is present, said carboxylated polymer system:
  (a) is substantially free from urethane linkages and urea linkages and also is substantially free from functional groups selected from the class consisting of hydroxyl, amino, and isocyanato, and
  (b) contains at least sufficient water dispersed crosslinking agent selected from the group consisting of multifunctional carbodiimides and polyfunctional aziridines to crosslink said carboxylated polymer when said carboxylated polymer and said crosslinking agent are dried from an aqueous dispersion at room temperatures.

9. The method of claim 1 wherein in said first composition, said water dispersed, inert film-forming polymer system is comprised of said carboxylated polymer system.

10. The method of claim 1 wherein in said fourth composition said water dispersed, inert film-forming polymer system is comprised of said polyurethane polymer system.

11. The method of claim 1 wherein said step (E) is repeated a plurality of times, and each one of the resulting so produced plurality of disperse phase gel compositions has a different color relation to others thereof, and each one of said resulting disperse phase gel compositions is so mixed with said fourth composition.

12. The method of claim 11 wherein the weight ratio of the total weight of said disperse phase gel compositions to the weight of said fourth composition is in the range of about 1:1 to about 6:4.

13. The method of claim 11 wherein each of said disperse phase gel compositions has a viscosity which is about 7 to about 8.5 times greater than the viscosity of said fourth composition.

14. The method of claim 1 wherein said step (E) said first composition is so blended with said combination of said second composition and said third composition to produce said first disperse phase gel composition.

15. The method of claim 1 wherein a second disperse phase gel composition is prepared by said steps (A) through (C) and (E), said second disperse phase composition contains a pigment which results in a different coloration for said second disperse phase gel composition relative to said first disperse phase gel composition and said second disperse phase composition is likewise additionally mixed with said fourth composition as prepared by said step (D) and broken up into discrete gel bodies using a mixing procedure as described in said step (F), thereby to produce a multicolor water-in-water paint.

16. The method of claim 15 wherein a plurality of further disperse phase gel compositions are prepared each by said steps (A) through (C) and (E), each of said further disperse phase gel compositions contains a pigment which is different from all others of said disperse phase gel compositions, and each of said further disperse phase compositions is mixed with said fourth composition and broken up into discrete gel bodies using a mixing procedure as described in said step (F), thereby to produce a multicolor water-in-water paint.

17. A water-in-water multicolor paint comprising a discontinuous aqueous phase dispersed in a continuous aqueous phase, said discontinuous aqueous phase being comprised of a plurality of discrete gel bodies, such gel bodies being comprised of a uniform aqueous composition containing in admixture:

a water dispersed, inert film-forming, crosslinkable polymer system selected from the group consisting of a polyurethane polymer system, a carboxylated polymer system and mixtures thereof, said polyurethane polymer system comprising on a 100 weight percent total polymer solids basis about 75 to and including 100 weight percent of polyurethane polymer and correspondingly from and including 0 up to about 25 weight percent of reactive curative, and said carboxylated polymer system comprising on a 100 weight percent total polymer solids basis about 75 to and including 100 weight percent carboxylated polymer and correspondingly from and including 0 up to about 25 weight percent of organic crosslinking agent;

cellulose material selected from the class consisting of hydroxy (lower alkyl) cellulose and alkali metal carboxylated (lower alkyl) cellulose; and at least one gel former selected from the class consisting of quaternized ethyl cellulose, and incorporating a preformed water dispersed gel comprised of water swellable clay, peptizing agent and water;

said continuous aqueous phase being a preformed gel comprised of said water dispersed, inert film-forming, crosslinkable polymer system, said water swellable clay, said peptizing agent and water, the viscosity of said continuous phase being less than the viscosity of said discontinuous phase, said water dispersed, film-forming, crosslinkable polymer system comprising in said continuous aqueous phase on a 100 weight percent total polymer solids basis about 75 to and including 100 weight percent of said polyurethane polymer system and correspondingly from and including 0 up to about 25 weight percent of said carboxylated polymer system;

at least one of said discontinuous aqueous phase and said continuous aqueous phase containing a water dispersed, film-forming crosslinkable pressure-responsive contact adhesive that is selected from the group consisting of polyurethanes and acrylic polymers;

said multicolor paint having been prepared by the method of claim 1.

18. The multicolor paint of claim 17 wherein the total amount of said adhesive in said paint ranges from about 5 to about 30 weight percent and wherein said continuous phase contains no more than about 10 weight percent of said adhesive and said continuous phase contains no more than about 30 weight percent of said adhesive.

19. The multicolor paint of claim 17 wherein said inert film-forming polymer system comprises a water dispersed polyurethane polymer system which is:

(a) comprised of polyurethane polymer molecules produced by polymerizing mainly monomers which are characterized by containing at least three functional groups per monomer, and wherein said functional groups are selected from the group consisting of isocyanato, hydroxyl, primary amino and secondary amino, and (b) self crosslinkable when dried from an aqueous dispersion at ambient temperatures, and wherein said pressure-sensitive adhesive comprises a polyurethane.

20. The multicolor paint of claim 17 wherein said adhesive is selected from the group consisting of acrylic polymers having a butyl acrylate backbone and aliphatic polyurethane polymers having a polyether backbone.

21. The multicolor paint of claim 17 wherein said adhesive comprises a water dispersed acrylic adhesive having a butyl acrylate backbone.

22. The multicolor paint of claim 17 wherein said adhesive comprises an aliphatic polyurethane polymer having a polyether backbone.

23. The multicolor paint of claim 17 wherein said inert film-forming polymer system comprises a polyurethane polymer system which is:
 (a) characterized by containing a plurality of terminal isocyanato groups per molecule which are each blocked by an associated blocking agent, and said blocking agent is thermally released from substantially all its associated respective isocyanato groups at a temperature in the range of about 50° to about 150° C.; and
 (b) crosslinkable when dried from an aqueous dispersion and said blocking agent is so thermally released at said temperature.

24. The multicolor paint of claim 17 wherein, when in said water dispersed, inert film-forming, polymer system said carboxylated polymer system is present, said carboxylated polymer system:
 (a) is substantially free from urethane linkages and urea linkages and also is substantially free from functional groups selected from the class consisting of hydroxyl, amino, and isocyanato, and
 (b) contains sufficient water dispersed crosslinking agent selected from the group consisting of multifunctional carbodiimides and polyfunctional aziridines to crosslink said carboxylated polymer when said carboxylated polymer and said crosslinking agent are dried from an aqueous dispersion at room temperatures.

25. The multicolor paint of claim 17 wherein, in said discontinuous phase, said inert film-forming polymer system is comprised of said carboxylated polymer system.

26. The multicolor paint of claim 17 wherein, in said continuous phase, said inert film-forming polymer system is comprised of said polyurethane polymer system.

27. The multicolor paint of claim 17 wherein said adhesive is contacted in said continuous phase.

28. The multicolor paint of claim 17 wherein said adhesive is contained in both said continuous phase and said discontinuous phase.

29. The multicolor paint of claim 17 wherein said adhesive is contained in said discontinuous phase.

30. The multicolor paint of claim 17 wherein said discontinuous phase is comprised of at least two different classes of discrete gel bodies which respective classes differ from each other in color.

31. The multicolor paint of claim 17 wherein the weight ratio of said discontinuous aqueous phase to said continuous aqueous phase is in the range of about 1:1 to about 6:4.

32. The multicolor paint of claim 17 wherein said discontinuous aqueous phase has an average viscosity which is about 7 to about 8.5 times greater than the viscosity of said continuous aqueous phase.

33. A coating produced by applying a continuous layer of a multicolor paint of claim 17 to a surface and then drying said so applied layer.

34. A coating produced by applying a continuous layer of a multicolor paint of claim 32 to a surface and then drying said so applied layer.

* * * * *

UNITED STATES PATENT AND TRADEMARK OFFICE
CERTIFICATE OF CORRECTION

PATENT NO. : 5,318,619
DATED : June 7, 1994
INVENTOR(S) : James F. Lynch and John Predkelis It is certified that error appears in the above-indentified patent and that said Letters Patent is hereby corrected as shown below:

Col. 32, line 15, change "No." to --No. 4--.
Col. 32, line 33, change "No." to --No. 4--.
Col. 37, Claim 1, line 52, change "composition" to --combination--.
Col. 38, claim 1, lines 4-5, change "proportional the average" to proportional to the average--.

Signed and Sealed this

Twenty-ninth Day of November, 1994

Attest:

BRUCE LEHMAN

Attesting Officer    Commissioner of Patents and Trademarks